US012388181B2

(12) United States Patent
Wu

(10) Patent No.: US 12,388,181 B2
(45) Date of Patent: Aug. 12, 2025

(54) ANTENNA ASSEMBLY AND ELECTRONIC DEVICE

(71) Applicant: GUANGDONG OPPO MOBILE TELECOMMUNICATIONS CORP., LTD., Guangdong (CN)

(72) Inventor: Xiaopu Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 198 days.

(21) Appl. No.: 18/354,475

(22) Filed: Jul. 18, 2023

(65) Prior Publication Data

US 2023/0361470 A1 Nov. 9, 2023

Related U.S. Application Data

(63) Continuation of application No. PCT/CN2021/134511, filed on Nov. 30, 2021.

(30) Foreign Application Priority Data

Jan. 28, 2021 (CN) ......................... 202110122572.7

(51) Int. Cl.
*H01Q 5/335* (2015.01)
*H01Q 1/22* (2006.01)

(52) U.S. Cl.
CPC ............... *H01Q 5/335* (2015.01); *H01Q 1/22* (2013.01)

(58) Field of Classification Search
CPC .......... H01Q 5/342; H01Q 5/35; H01Q 1/241; H01Q 5/378; H01Q 5/40; H01Q 9/42;
(Continued)

(56) References Cited

U.S. PATENT DOCUMENTS 11,735,809 B2 * 8/2023 Wang ........................ H01Q 9/42 343/702
2017/0279185 A1 9/2017 Hung et al.
(Continued)

FOREIGN PATENT DOCUMENTS

CN 105871407 8/2016
CN 106450662 2/2017
(Continued)

OTHER PUBLICATIONS

EPO, Extended European Search Report for EP Application No. 21922510.9, Jun. 13, 2024.
(Continued)

*Primary Examiner* — Hai V Tran
(74) *Attorney, Agent, or Firm* — Hodgson Russ LLP

(57) ABSTRACT

Provided is an antenna assembly and an electronic device. The antenna assembly includes the following. A first antenna including a first radiator and a first signal source electrically connected to the first radiator. A second antenna including a second radiator and a third radiator, one end of the second radiator is spaced apart from one end of the first radiator with a first coupling gap, and the other end of the second radiator is spaced apart from one end of the third radiator with a second coupling gap. The first radiator is configured to generate at least one resonant mode under excitation of the first signal source, and a part of the second radiator that is close to the second coupling gap is configured to generate at least one resonant mode under excitation of the first signal source through coupling of the first radiator.

20 Claims, 16 Drawing Sheets

(58) Field of Classification Search
CPC ............ H01Q 1/36; H01Q 1/22; H01Q 1/521; H01Q 1/243; H01Q 5/335
See application file for complete search history.

(56) References Cited

U.S. PATENT DOCUMENTS

| | | | | |
|---|---|---|---|---|
| 2019/0181555 | A1* | 6/2019 | Lee | H01Q 3/247 |
| 2019/0252764 | A1* | 8/2019 | Liao | H01Q 5/378 |
| 2020/0076059 | A1* | 3/2020 | Hsiao | H01Q 1/1207 |
| 2020/0112080 | A1 | 4/2020 | Wu et al. | |
| 2020/0373669 | A1 | 11/2020 | Xue et al. | |
| 2021/0320392 | A1* | 10/2021 | Hsu | H01Q 5/328 |
| 2022/0059931 | A1* | 2/2022 | Xie | H01Q 5/328 |
| 2023/0344151 | A1* | 10/2023 | Wu | H01Q 9/42 |
| 2023/0344152 | A1* | 10/2023 | Wu | H01Q 1/521 |
| 2023/0352852 | A1* | 11/2023 | Wu | H01Q 1/241 |

FOREIGN PATENT DOCUMENTS

| | | |
|---|---|---|
| CN | 108281767 | 7/2018 |
| CN | 108511881 | 9/2018 |
| CN | 108631041 | 10/2018 |
| CN | 208127429 | 11/2018 |
| CN | 109687111 | 4/2019 |
| CN | 111190500 | 5/2020 |
| CN | 111244616 | 6/2020 |
| CN | 112086753 | 12/2020 |
| CN | 212277399 | 1/2021 |
| EP | 4266494 | 10/2023 |

OTHER PUBLICATIONS

WIPO, International Search Report and Written Opinion for International Application No. PCT/CN2021/134511, Feb. 16, 2022.

CNIPA, First Office Action for CN Application No. 202110122572.7, Oct. 8, 2022.

Li, "Evaluation of Multiple Antenna Systems in Compact Mobile Terminals," China Doctoral Dissertation Full-text Database Information Technology Series, 2013.

CNIPA, Second Office Action for CN Application No. 202110122572.7, May 4, 2023.

Xie et al., "A broadband miniaturized three-frequency PIFA antenna," Telegraph Science Journal, Chinese Journal of Radio Science, Dec. 2010, vol. 25, No. 6.

Wu et al., "Dual-Band MIMO System Based on Metal Frame for 5G Applications," 2019 IEEE Conference on Antenna Measurements & Applications (CAMA), 2020.

CNIPA, Notification to Grant Patent Right for Invention for CN Application No. 202110122572.7, Jun. 25, 2023.

* cited by examiner

ANTENNA ASSEMBLY AND ELECTRONIC DEVICE

CROSS-REFERENCE TO RELATED APPLICATION(S)

This application is a continuation of International Application No. PCT/CN2021/134511, filed Nov. 30, 2021, which claims priority to Chinese Patent Application No. 202110122572.7, filed Jan. 28, 2021, the entire disclosures of which are incorporated herein by reference.

TECHNICAL FIELD

This application relates to the field of communication technologies, and in particular, to an antenna assembly and an electronic device.

BACKGROUND

With the development of technologies, electronic devices such as mobile phones that have communication functions become more and more popular, and the functions become more and more powerful. An electronic device generally includes an antenna assembly to implement a communication function of the electronic device. How to improve communication quality of the electronic device and at the same time facilitate miniaturization of the electronic device becomes a technical problem to be solved.

SUMMARY

Disclosed herein are an antenna assembly and an electronic device which can improve communication quality and facilitate overall miniaturization.

In a first aspect, an antenna assembly is provided in implementations of the disclosure. The antenna assembly includes: a first antenna including a first radiator and a first signal source electrically connected to the first radiator, and a second antenna including a second radiator and a third radiator. One end of the second radiator is spaced apart from one end of the first radiator with a first coupling gap, and the other end of the second radiator is spaced apart from one end of the third radiator with a second coupling gap. The first radiator is configured to generate at least one resonant mode under excitation of the first signal source, and a part of the second radiator that is close to the second coupling gap is configured to generate at least one resonant mode under excitation of the first signal source through coupling of the first radiator.

In a second aspect, an electronic device is provided. The electronic device includes a frame and the antenna assembly. The first radiator, the second radiator, the third radiator, and the frame are integrated into a whole; or the first radiator, the second radiator, and the third radiator are formed on a surface of the frame; or the first radiator, the second radiator, and the third radiator are disposed on a flexible circuit board, and the flexible circuit board is attached to a surface of the frame. And/or, the frame includes multiple side edges connected end to end in sequence, and two adjacent side edges are intersected. The first coupling gap and the second coupling gap are respectively disposed on two intersected side edges of the frame; or, the first coupling gap and the second coupling gap are both disposed on a same side edge of the frame.

BRIEF DESCRIPTION OF THE DRAWINGS

To describe the technical solutions in the implementations of the disclosure more clearly, the following briefly introduces the accompanying drawings required for describing the implementations. Apparently, the accompanying drawings in the following description show merely some implementations of the disclosure, and a person of ordinary skill in the art may still derive other drawings from these accompanying drawings without creative efforts.

DETAILED DESCRIPTION

The following clearly and completely describes the technical solutions in implementations of the disclosure with reference to the accompanying drawings in the implementations of the disclosure. Apparently, the described implementations are merely a part rather than all of the implementations of the disclosure. The implementations described herein can be combined with each other appropriately.

Figure 1:
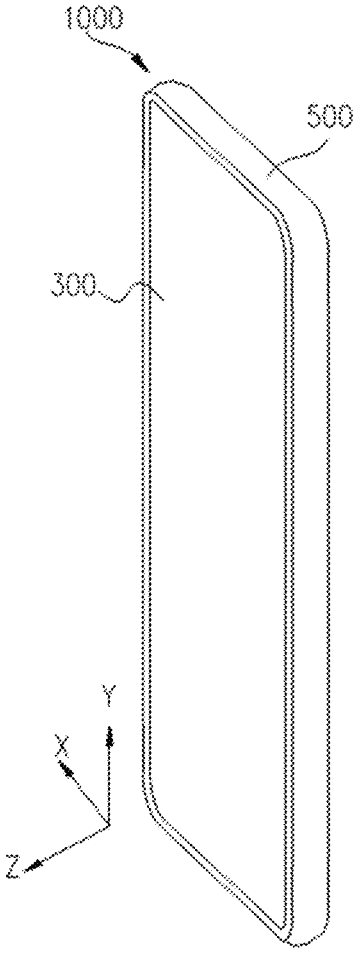
FIG. 1 is a schematic structural diagram of an electronic device according to an implementation of the disclosure.

Please refer to FIG. 1, FIG. 1 is a schematic structural diagram of an electronic device according to an implementation of the disclosure. The electronic device 1000 may be a device capable of transmitting and receiving an electromagnetic wave signal(s), such as a telephone, a television, a tablet computer, a mobile phone, a camera, a personal computer, a notebook computer, a vehicle-mounted device, an earphone, a watch, a wearable device, a base station, a vehicle-mounted radar, and a customer premise equipment (CPE). Taking the electronic device 1000 as a mobile phone as an example, for ease of description, the electronic device 1000 is described by taking the electronic device 1000 at a first view angle as a reference, a width direction of the electronic device 1000 is defined as an X direction, a length direction of the electronic device 1000 is defined as a Y direction, and a thickness direction of the electronic device 1000 is defined as a Z direction. A direction indicated by an arrow is a forward direction.

Figure 2:
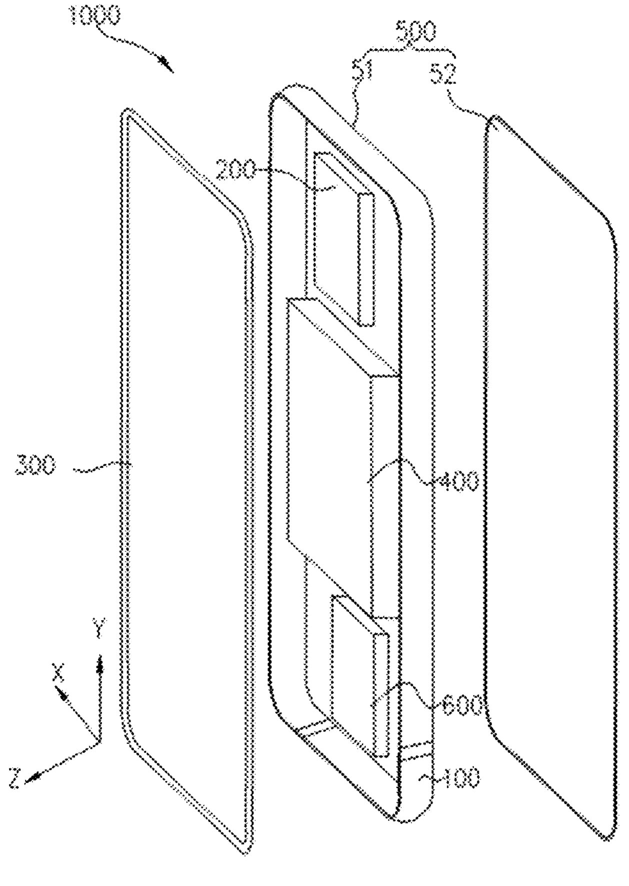
FIG. 2 is an exploded view of the electronic device illustrated in FIG. 1.

Please refer to FIG. 2, the electronic device 1000 includes an antenna assembly 100, which is configured to transmit and receive a radio frequency signal, so as to implement a communication function of the electronic device 1000. At least some components of the antenna assembly 100 are disposed on the main board 200 of the electronic device 1000. It can be understood that, the electronic device 1000 further includes a display screen 300, a battery 400, a housing 500, a camera, a microphone, a receiver, a speaker, a face recognition module, a fingerprint recognition module, and other components that can implement basic functions of a mobile phone, which are not described again in this implementation.

The antenna assembly 100 is a built-in antenna of the electronic device 1000. The antenna assembly 100 is disposed in the housing of the electronic device 1000. The specific position of the antenna assembly 100 is described in the following.

Figure 3:
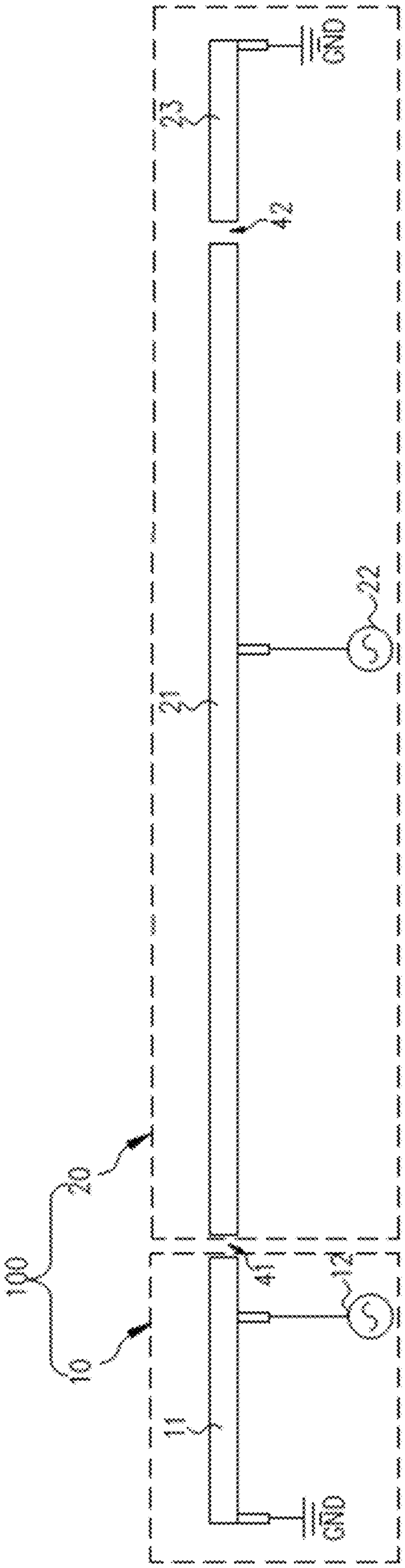
FIG. 3 is a schematic structural diagram of a first type of antenna assembly according to an implementation of the disclosure.

Please refer to FIG. 3, the antenna unit 100 includes a first antenna 10 and a second antenna 20, where the first antenna 10 and the second antenna 20 are antennas excited by different signal sources. This disclosure does not limit the specific frequency bands (in the following, "band(s)" for short) of the first antenna 10 and the second antenna 20, for example, the first antenna 10 and the second antenna 20 are classified according to transmission/reception (in the following, "T/R" for short) bands, and the first antenna 10 and the second antenna 20 may both be low-frequency antennas supporting low-frequency signals; alternatively, one of the first antenna 10 and the second antenna 20 is a middle high-frequency antenna supporting a middle high-frequency signal, and the other is a low-frequency antenna supporting low-frequency signals; alternatively, both of the first antenna 10 and the second antenna 20 are middle high-ultra high-frequency antennas supporting middle high-ultra high-frequency signals. The low band (LB) refers to a band with a frequency less than 1000 MHz, and the middle high-ultra high band refers to a band covered by a middle high band (MHB) and an ultra-high band (UHB). The middle-high band is 1000 MHz-3000 MHz, and the ultra-high band is 3000 MHz-10000 MHz. This is one classification method, but the disclosure is not limited thereto.

The low band is at least one of 4G long term evolution (LTE) and 5G new radio (NR). For example, specific application bands include but are not limited to B28, B20, B5, B8, N28, N20, N5, and N8. Definitely, in the low band, a 4G LTE signal may be loaded separately, or a 5G NR signal may be loaded separately, or a 4G LTE signal and a 5G NR signal may be loaded at the same time, that is, a dual connection (LTE NR double connect, EN-DC) between a 4G wireless access network and a 5G-NR is achieved.

The middle-high band is at least one of 4G LTE, 5G NR, GPS-L1, GPS-L5, WIFI-2.4G, WIFI-5G, and the like. For example, specific application bands include but are not limited to B32, B3, B39, B1, B40, B41, N78, N79, and the like. Definitely, in the middle-high band, a 4G LTE signal may be separately loaded, or a 5G NR signal may be separately loaded, or a 4G LTE signal and a 5G NR signal may be loaded at the same time, that is, EN-DC between a 4G wireless access network and a 5G-NR is implemented.

The low band and the middle high-ultra high band transmitted and received by the antenna assembly 100 provided in the implementation may also be obtained by aggregating multiple carriers (carriers are radio waves of a specific frequency), i. e. realizing carrier aggregation (CA), so as to increase a transmission bandwidth and improve a signal transmission rate.

Please refer to FIG. 3, the first antenna 10 includes a first radiator 11 and a first signal source 12 electrically connected to the first radiator 11.

Please refer to FIG. 3, the second antenna 20 includes a second radiator 21 and a third radiator 23. Optionally, the second antenna 20 further includes a second signal source 22 configured to feed the second radiator 21. A first coupling gap 41 is disposed between one end of the second radiator 21 and one end of the first radiator 11. A second coupling gap 42 is disposed between the other end of the second radiator 21 and one end of the third radiator 23. The shape of the first radiator 11, the shape of the second radiator 21, and the shape of the third radiator 23 are not specifically limited in the disclosure, and include, but are not limited to, strips, sheets, rods, coatings, and films. In this implementation, that the first radiator 11, the second radiator 21, and the third radiator 23 are all strip-shaped is used as an example for description, but an extending direction of the first radiator 11, the second radiator 21, and the third radiator 23 is not limited, and therefore, the foregoing radiators may all have a linear shape, a curved shape, a multi-segment bend shape, or the like. On the extending trajectory, the above-mentioned radiator may be a strip with a uniform width, and may also be a strip with a gradually changed width or a different width such as having a widened region.

The first coupling gap 41 is a split between a first end of the first radiator 11 and a first end of the second radiator 21. For example, a width of the split is 0.5-2 mm, but is not limited to this size. The first radiator 11 and the second radiator 21 can be in capacitive coupling through the first coupling gap 41. "Capacitive coupling" means that an electric field is generated between the first radiator 11 and the second radiator 21, a signal of the first radiator 11 can be transmitted to the second radiator 21 through the electric field, and a signal of the second radiator 21 can be transmitted to the first radiator 11 through the electric field, so that the first radiator 11 and the second radiator 21 can achieve electrical signal conduction even in a disconnected state. The second coupling gap 42 is a split between a second end of the second radiator 21 and a first end of the third radiator 23, and a width of the split is 0.5~2 mm, but is not limited to this size. The second radiator 21 and the third radiator 23 can be in capacitive coupling through the second coupling gap 42. In addition, the second end of the first radiator 11 is grounded, and the second end of the third radiator 23 is grounded.

Grounding of the radiators of the antenna assembly 100 is described below. Optionally, the antenna assembly 100 itself has a reference ground GND. Specific forms of the reference ground GND include, but are not limited to, a metal plate directly exposed outside, a metal layer formed inside a flexible circuit board, and the like. The radiator of the antenna assembly 100 is electrically connected to the reference ground GND of the antenna assembly 100. When the antenna assembly 100 is disposed in the electronic device 1000, the reference ground GND of the antenna assembly 100 is electrically connected to the reference ground GND of the electronic device 1000. Still alternatively, the antenna assembly 100 itself has no reference ground GND, and the radiator of the antenna assembly 100 is electrically connected to the reference ground GND of the electronic device 1000 or the reference ground GND of an electronic element within the electronic device 1000 directly or indirectly via an intermediate conductive connector.

The first signal source 12 is a radio frequency transceiver chip for transmitting a radio frequency signal or a feeder electrically connected to the radio frequency transceiver chip for transmitting a radio frequency signal.

The first radiator 11 is configured to generate, under excitation of the first signal source 12, at least one resonant mode. The first radiator 11 is further configured to excite through the first coupling gap 41, under excitation of the first signal source 12, a part of the second radiator 21 which is close to the second coupling gap 42 to generate at least one resonant mode. The resonant mode characterizes that the electromagnetic wave transmission efficiency of the antenna assembly 100 at the resonant frequency of the resonant mode is high. That is to say, the second radiator 21 has high T/R efficiency at a certain resonant frequency under excitation of the first signal source 12, and can further support T/R of an electromagnetic wave signal of a band near the resonant frequency.

In other words, the radiator of the second antenna 20 can also be used by the first antenna 10 as a radiator of the first antenna 10 to generate a resonant mode, so that the band of the antenna assembly 100 is expanded. For an uncoupled antenna assembly 100, in order to achieve the described bandwidth, a longer first radiator 11 needs to be provided, or a segment of radiator needs to be added in addition to the first radiator 11, such that the overall stack size of the antenna assembly 100 is larger, and for an electronic device 1000 with extremely limited space, the antenna assembly 100 with a larger size is not beneficial to the miniaturization of the electronic device 1000.

According to the antenna assembly 100 and the electronic device 1000 provided in implementations of the disclosure, the radiator of the first antenna 10 and the radiator of the second antenna 20 are designed to be in capacitive coupling through the first coupling gap 41. The signal source of the first antenna 10 is capable of exciting, through coupling of the first radiator 11, the radiator of the second antenna 20 to transmit and receive electromagnetic wave signals of corresponding bands. In this way, the radiator of the second antenna 20 can be used as the radiator of the first antenna 10. As a result, the space for stacking the radiator of the first antenna 10 and the radiator of the second antenna 20 is saved, and the overall size of the antenna assembly 100 is reduced. The second coupling gap 42 is disposed in the radiator of the second antenna 20, so that the second radiator 21 can generate at least one resonant mode close to the second coupling gap 42 under excitation of the signal source of the first antenna 10, or generate at least one resonant mode close to the first coupling gap 41 and generate at least one resonant mode close to the second coupling gap 42. In this way, the number of positions where resonant modes are generated by the antenna assembly 100 can be increased, and the number of resonant modes generated by the antenna assembly 100 can be increased, thereby further increasing the bandwidths for transmitting and receiving signals of the antenna assembly 100.

The resonant frequency of the resonant mode generated by the first radiator 11 under excitation of the first signal source 12 is different from the resonant frequency of the resonant mode generated by the second radiator 21 under excitation through coupling of the first radiator 11.

In other words, in the antenna assembly 100, the first signal source 12 is configured to excite the first radiator 11 to generate a resonant mode at one frequency, the first signal source 12 is also configured to excite the second radiator 21 to generate a resonant mode at another frequency since energy can be transferred through capacitive coupling between the first radiator 11 and the second radiator 21. Since the resonant mode generated by the first radiator 11 has a frequency different from the resonant mode generated by the second radiator 21, the band covered by the first radiator 11 under excitation of the first signal source 12 is different from the band covered by the second radiator 21 under excitation of the first signal source 12, and these bands are combined together, so that the band width supported by the antenna assembly 100 is increased, thereby improving the transmission rate.

In this implementation, the first signal source 12 is a middle high-ultra high-frequency excitation signal source, where the first signal source 12 is configured to excite both the first radiator 11 and the second radiator 21 to generate middle high-ultra high-frequency electromagnetic wave signals. In other implementations, the first signal source 12 may be a signal source for exciting a low-frequency signal, so as to excite the first radiator 11 and the second radiator 21 to generate a low-frequency electromagnetic wave signal.

Further, by designing the length of the first radiator 11 or a matching circuit of the first radiator 11, the frequency interval between the at least two resonant modes is relatively large, and the overlapping range of adjacent resonant modes is reduced, so as to further improve the band width supported by the first radiator 11. The difference between the resonant frequency of the resonant mode generated by the first radiator 11 under excitation of the first signal source 12 and the resonant frequency of the resonant mode generated by the second radiator 21 under excitation of the first signal source 12 is a first preset value, for example, the first preset value is 500 MHz-5000 MHz, but is not limited thereto. The bandwidth of each resonant mode is not specifically limited in the disclosure. The resonant modes generated by the first radiator 11 and the second radiator 21 under excitation of the first signal source 12 are adjacent and continuous resonant modes, and may also be discontinuous resonant modes. When the resonant modes generated by the first radiator 11 and the second radiator 21 under excitation of the first signal source 12 are adjacent resonant modes and are continuous with each other, the bands supported by the first radiator 11 and the second radiator 21 may be aggregated into a relatively wide band by means of carrier aggregation, thereby improving the transmission rate. For example, a band supported by the first radiator 11 is 1500 MHz-2000 MHz, and a band supported by the second radiator 21 is 2000 MHz-2500 MHz. A band of 1500 MHz-2500 MHz can be formed through carrier aggregation, thereby realizing a 1000 MHz bandwidth.

Figure 4:
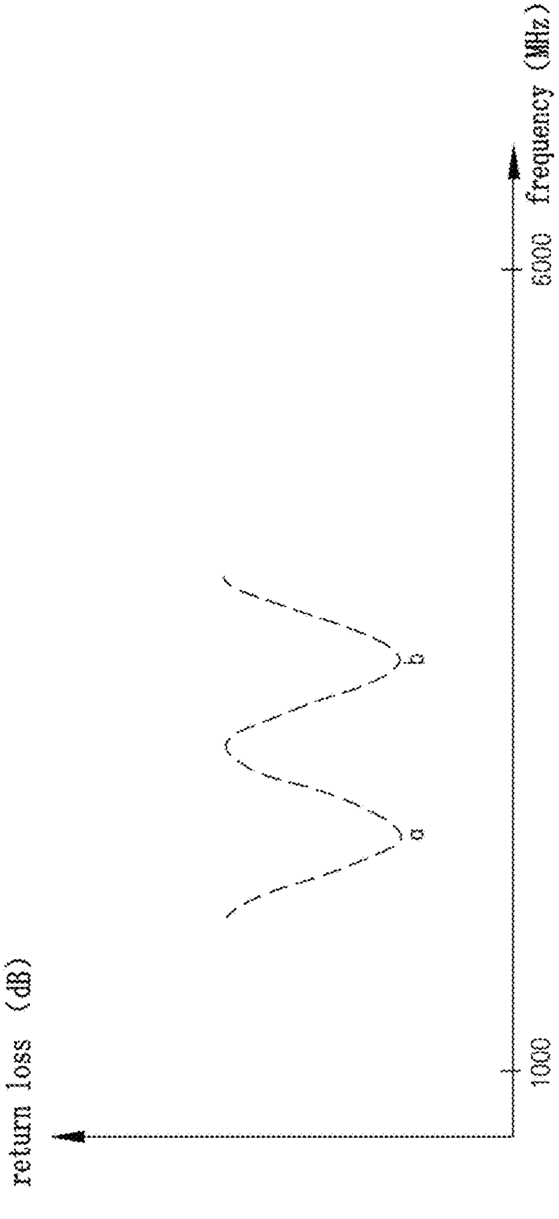
FIG. 4 is a schematic diagram of a first sub-resonant mode and a second sub-resonant mode according to an implementation of the disclosure.

Alternatively, referring to FIG. 4, the first radiator 11 is configured to excite through the first coupling gap 41, under excitation of the first signal source 12, a part of the second radiator 21 close to the first coupling gap 41 and a part of the second radiator 21 close to the second coupling gap 42 to generate at least one resonant mode. The at least one resonant mode includes a first sub-resonant mode a and a second sub-resonant mode b. In other words, the resonant modes generated by the second radiator 21 under excitation through the coupling of the first radiator 11 (namely, under excitation of the first signal source 12) include at least the first sub-resonant mode a and the second sub-resonant mode b. The resonant frequency of the first sub-resonant mode a is less than the resonant frequency of the second sub-resonant mode b. In other words, the second radiator 21 is configured to generate at least two resonant modes under excitation of the first signal source 12. The at least two resonant modes may all be generated by the second radiator 21 close to the first coupling gap 41. Alternatively, the at least two resonant modes may all be generated by the second radiator 21 close to the second coupling gap 42. Alternatively, part of the at least two resonant modes is generated by the second radiator 21 at a position close to the first coupling gap 41, and the other part of the at least two resonant modes is generated by the second radiator 21 at a position close to the second coupling gap 42.

In other words, one of the first sub-resonant mode a and the second sub-resonant mode b is generated by the part of the second radiator 21 close to the first coupling gap 41, and the other one of the first sub-resonant mode a and the second sub-resonant mode b is generated by the part of the second radiator 21 close to the second coupling gap 42. Alternatively, both the first sub-resonant mode a and the second sub-resonant mode b are generated by the part of the second radiator 21 close to the second coupling gap 42. Alternatively, both the first sub-resonant mode a and the second sub-resonant mode b are generated by the part of the second radiator 21 close to the first coupling gap 41.

By setting the second radiator 21 to generate at least two resonant modes, on the one hand, the width of the band covered through excitation of the first signal source 12 is larger, on the other hand, the first antenna 10 has a higher utilization rate for the second radiator 21. The utilization rate of the first antenna 10 for the second radiator 21 is improved while higher bandwidth is achieved, therefore, the stack size of the antenna assembly 100 is further reduced, and thus promote miniaturization design of the electronic device 1000 to ensure high bandwidth.

In implementations of the disclosure, the first sub-resonant mode a is generated by the part of the second radiator 21 close to the first coupling gap 41, and the second sub-resonant mode b is generated by the part of the second radiator 21 close to the second coupling gap 42. In this way, the first sub-resonant mode a and the second sub-resonant mode b do not affect each other.

Optionally, the length of the part of the second radiator 21 that generates the first sub-resonant mode a is set to be different from the length of the part of the second radiator 21 that generates the second sub-resonant mode b, as such, the first sub-resonant mode a and the second sub-resonant mode b have different frequencies, so as to cover a relatively wide bandwidth.

Figure 5:
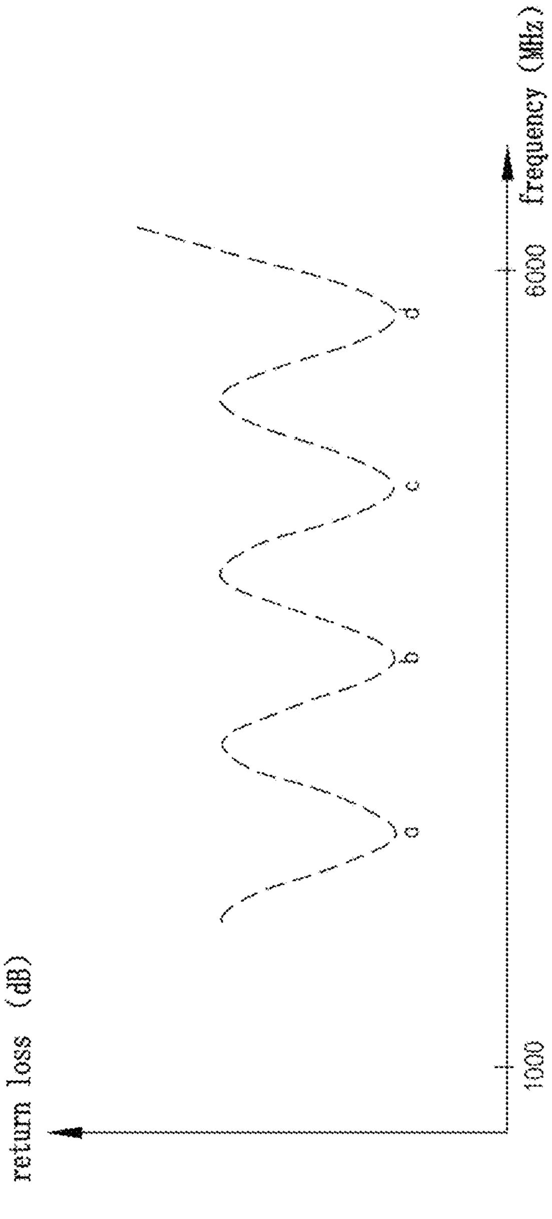
FIG. 5 is a schematic diagram of a first distribution of a first sub-resonant mode, a second sub-resonant mode, a third sub-resonant mode, and a fourth sub-resonant mode according to an implementation of the disclosure.

Please refer to FIG. 5, the resonant modes generated by the first radiator 11 under excitation of the first signal source 12 at least include a third sub-resonant mode c and a fourth sub-resonant mode d. Where the resonant frequency of the third sub-resonant mode c is less than the resonant frequency of the fourth sub-resonant mode d. In other words, the first radiator 11 can generate at least two resonant modes under action of the first signal source 12, and resonant bands of the at least two resonant modes are different, so as to increase a band width supported by the first radiator 11. In addition, a length of the first radiator 11 or a matching circuit of the first radiator is designed, so that a frequency interval between the at least two resonant modes is relatively large, and an overlapping range of adjacent resonant modes is reduced, so as to further improve a band width supported by the first radiator 11.

The resonant frequency of the sub-resonant mode can be adjusted by adjusting the length of each part of the first radiator 11 and the second radiator 21 for generating the sub-resonant mode or by adjusting the matching circuit. The magnitude of the resonant frequency of the first sub-resonant mode a, the second sub-resonant mode b, the third sub-resonant mode c, and the fourth sub-resonant mode d is not limited. The following implementations are exemplified.

In some possible implementations, referring to FIG. 5, the resonant frequency of the second sub-resonant mode b is less than the resonant frequency of the third sub-resonant mode c. In other words, the resonance frequency of the first sub-resonant mode a, the resonance frequency of the second sub-resonant mode b, the resonance frequency of the third sub-resonant mode c, and the resonance frequency of the fourth sub-resonant mode d are sequentially increased.

In this implementation, the first signal source 12 is configured to send a high-frequency signal, and the second signal source 22 is configured to send a low-frequency signal, therefore, the length of the first radiator 11 is relatively small, and the length of the second radiator 21 is relatively large. Due to the above size difference, when designing the first signal source 12 to excite to cover the high band, the relatively long second radiator 21 can support a relatively low band, in this way, it is convenient to design that the resonant frequency of the resonant mode generated by the first radiator 11 is greater than the resonant frequency of the resonant mode generated by the second radiator 21. In this way, the length of the second antenna 20 for the second radiator 21 is increased, and the utilization rate of the second radiator 21 is increased.

Alternatively, the magnitude of the resonant frequency may be inversely proportional to the length of the radiator generating the resonant mode.

Figure 6:
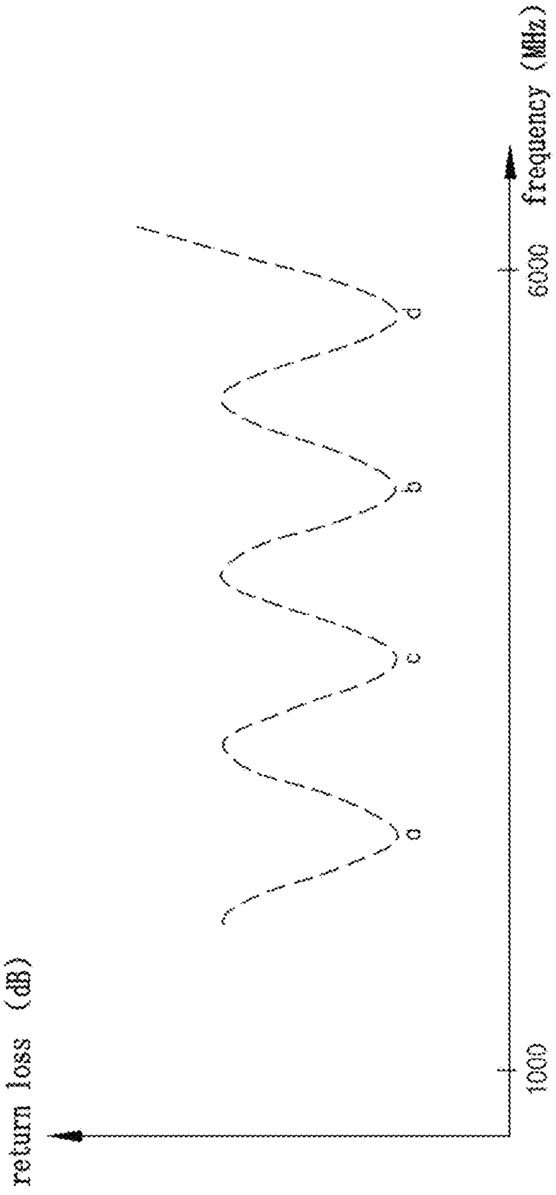
FIG. 6 is a schematic diagram of a second distribution of a first sub-resonant mode, a second sub-resonant mode, a third sub-resonant mode, and a fourth sub-resonant mode according to an implementation of the disclosure.

In some possible implementations, referring to FIG. 6, the resonant frequency of the second sub-resonant mode b is greater than the resonant frequency of the third sub-resonant mode c and less than the resonant frequency of the fourth sub-resonant mode d, and the resonant frequency of the first sub-resonant mode a is less than or greater than the resonant frequency of the third sub-resonant mode c.

In this implementation, the length of each of the radiation segments of the first radiator 11 for generating the third sub-resonant mode c and the fourth sub-resonant mode d are designed. When the band covered by the third sub-resonant mode c is discontinuous with the band covered by the fourth sub-resonant mode d, and a band between the band covered by the third sub-resonant mode c and the band covered by the fourth sub-resonant mode d needs to be used in practical use, the length of the part of the second radiator 21 for generating each sub-resonant mode or the matching circuit can be designed, so that the resonant frequency of the second sub-resonant mode b is between the resonant frequency of the third sub-resonant mode c and the resonant frequency of the fourth sub-resonant mode d, so that the second sub-resonant mode b covers the band between the band covered by the third sub-resonant mode c and the band covered by the fourth sub-resonant mode d. When the bandwidth between the band covered by the third sub-resonant mode c and the band covered by the fourth sub-resonant mode d is relatively large, and the band covered by the second sub-resonant mode b is insufficient to cover the bandwidth, the resonant frequency of the first sub-resonant mode a may also be designed to be between the resonant frequency of the third sub-resonant mode c and the resonant frequency of the fourth sub-resonant mode d, so that the band covered by the third sub-resonant mode c, the band covered by the first sub-resonant mode a, the band covered by the second sub-resonant mode b, and the band covered by the fourth sub-resonant mode d form a continuous or near-continuous band, or cover the required band, so as to improve the correspondence between the band range supported by the electronic device 1000 and the band range provided by the operator, and improve the communication quality of the electronic device 1000.

Figure 7:
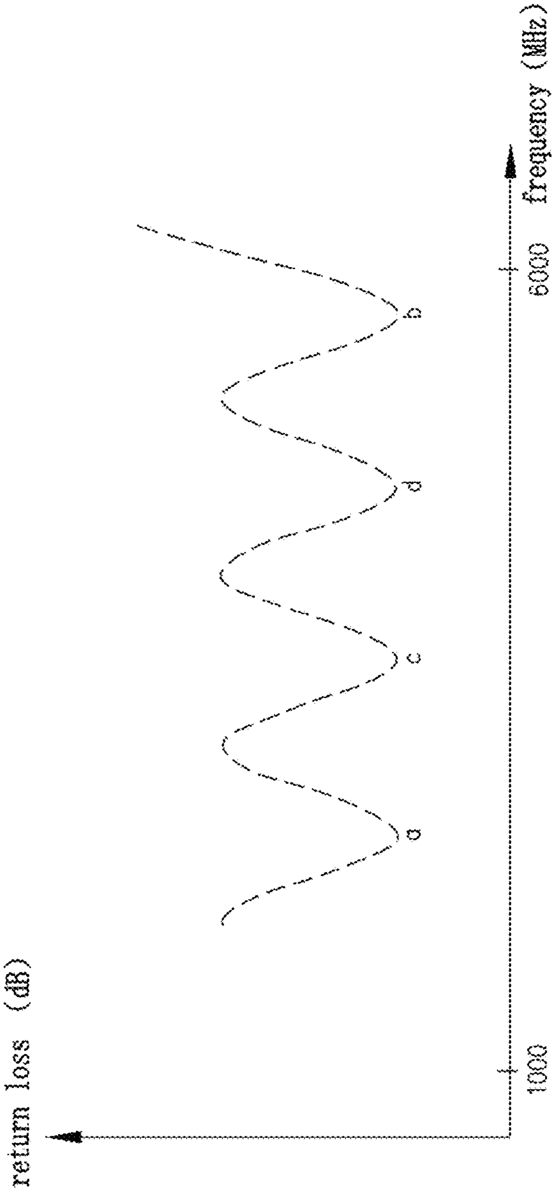
FIG. 7 is a schematic diagram of a third distribution of a first sub-resonant mode, a second sub-resonant mode, a third sub-resonant mode, and a fourth sub-resonant mode according to an implementation of the disclosure.

In some possible implementations, referring to FIG. 7, the resonant frequency of the second sub-resonant mode b is greater than the resonant frequency of the fourth sub-resonant mode d, and the resonant frequency of the first sub-resonant mode a is less than the resonant frequency of the third sub-resonant mode c. In other implementations, the resonant frequency of the second sub-resonant mode b is greater than the resonant frequency of the fourth sub-resonant mode d, and the resonant frequency of the first sub-resonant mode a is greater than the resonant frequency of the third sub-resonant mode c and less than the resonant frequency of the fourth sub-resonant mode d or the resonant frequency of the first sub-resonant mode a is greater than the resonant frequency of the fourth sub-resonant mode d.

In this implementation, the length of each part of the first radiator 11 or the second radiator 21 for generating respective sub-resonant modes or the matching circuit is adjusted. If the first antenna 10 needs to support a higher band signal and the size of the second radiator 21 cannot be further reduced, the length of the part of the second radiator 21 that generates the sub-resonant mode or the matching circuit can be adjusted, such that the second radiator 21 can generate a second sub-resonant mode b of a higher band, and the first antenna 10 can support signals of a higher band.

Figure 8:
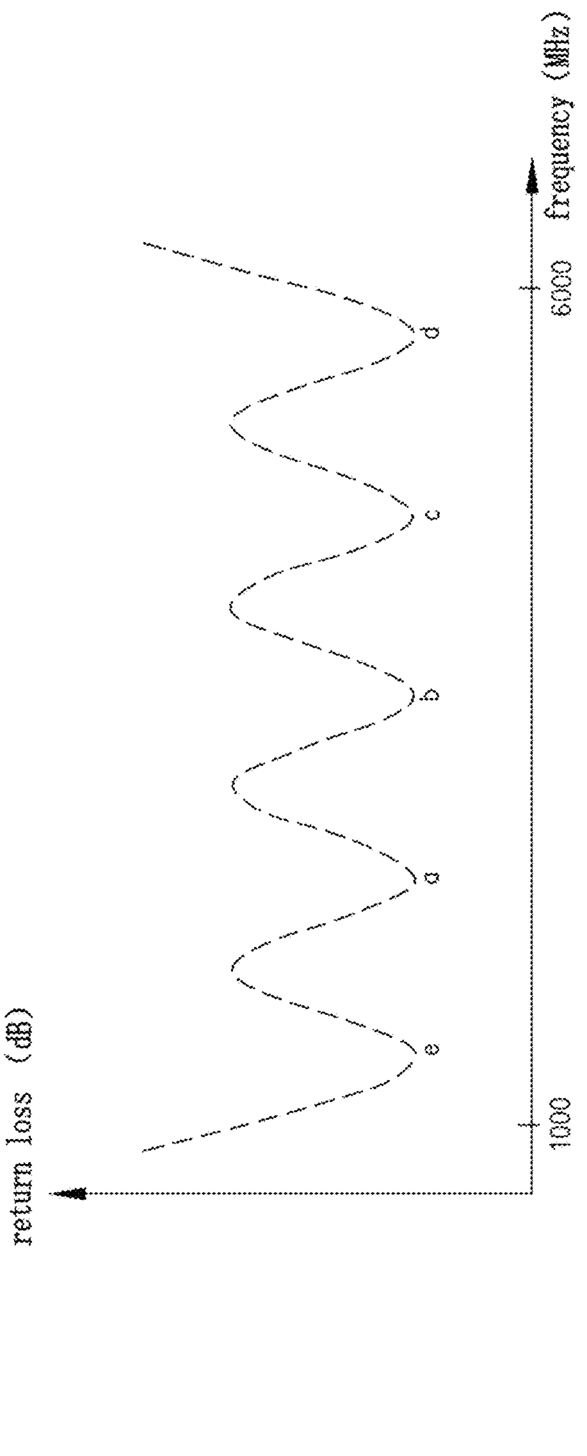
FIG. 8 is a schematic diagram of a fourth distribution of a first sub-resonant mode, a second sub-resonant mode, a third sub-resonant mode, a fourth sub-resonant mode, and a fifth sub-resonant mode according to an implementation of the disclosure.

Optionally, referring to FIG. 8, the resonant modes generated by the first radiator 11 under excitation of the first signal source 12 further includes a fifth sub-resonant mode e. The resonant frequency of the fifth sub-resonant mode e, the resonant frequency of the first sub-resonant mode a, the resonant frequency of the second sub-resonant mode b, the resonant frequency of the third sub-resonant mode c, and the resonant frequency of the fourth sub-resonant mode d increase sequentially. The fifth sub-resonant mode e is a resonant mode in which the first radiator 11 operates in high-order resonance. The third sub-resonant mode c is a resonant mode in which the first radiator 11 operates in a ground state.

Specifically, the resonant frequency of the fifth sub-resonant mode e is relatively low in the resonant frequencies in the resonant modes generated under excitation of the first signal source 12, so as to implement relatively low frequency coverage in the band covered by the first antenna 10. Because the length of the first radiator 11 is relatively small, the resonant mode in the ground state cannot support the relatively low band, therefore, the signal transmitted by the first signal source 12 is fed into the first radiator 11 by means of capacitive coupling feed, so as to excite the first radiator 11 to generate a high-order resonance, thereby exciting a relatively low band on the relatively short first radiator 11, improving the utilization rate of the first radiator 11 and increasing the supporting bandwidth of the first antenna 10.

It can be understood that, in any one of the foregoing implementations, the first sub-resonant mode a, the second sub-resonant mode b, the third sub-resonant mode c, the fourth sub-resonant mode d, and the fifth sub-resonant mode e may all be aggregated in a carrier aggregation manner, so as to form a band with relatively wide bandwidth and improve the signal transmission rate.

Optionally, the first signal source 12 is a signal source for transmitting a middle high-ultra high-frequency signal. A bandwidth of a band formed through combination of a band covered by a resonant mode generated by the first radiator 11 under excitation of the first signal source 12 and a band covered by a resonant mode generated by the second radiator 21 under excitation of the first signal source 12 is 500 MHz-5000 MHz. That is, the bands covered by the fifth sub-resonant mode e, the first sub-resonant mode a, the second sub-resonant mode b, the third sub-resonant mode c, and the fourth sub-resonant mode d are combined into a relatively large band bandwidth through carrier aggregation, for example, 500 MHz-5000 MHz, but the disclosure is not limited thereto.

And/or, a band covered by the resonant mode generated by the first radiator 11 under excitation of the first signal source 12 and a band covered by the resonant mode generated by the second radiator 21 under excitation of the first signal source 12 are both greater than 1000 MHz.

Further, a band formed through combination of the band covered by the resonant mode generated by the first radiator 11 under excitation of the first signal source 12 and the band covered by the resonant mode generated by the second radiator 21 under excitation of the first signal source 12 covers 1000 MHz-600 MHz. As such, the first antenna 10 can support at least one of the middle high-ultra high band in 4G LTE, the middle high-ultra high band in 5G NR, GPS-L1, GPS-L5, WiFi-2.4G, WiFi-5G, and/or the like.

Specific structures of the first antenna 10 and the second antenna 20 are not specifically limited in the disclosure, and specific structures of the first antenna 10 and the second antenna 20 are illustrated in the following implementations.

Figure 9:
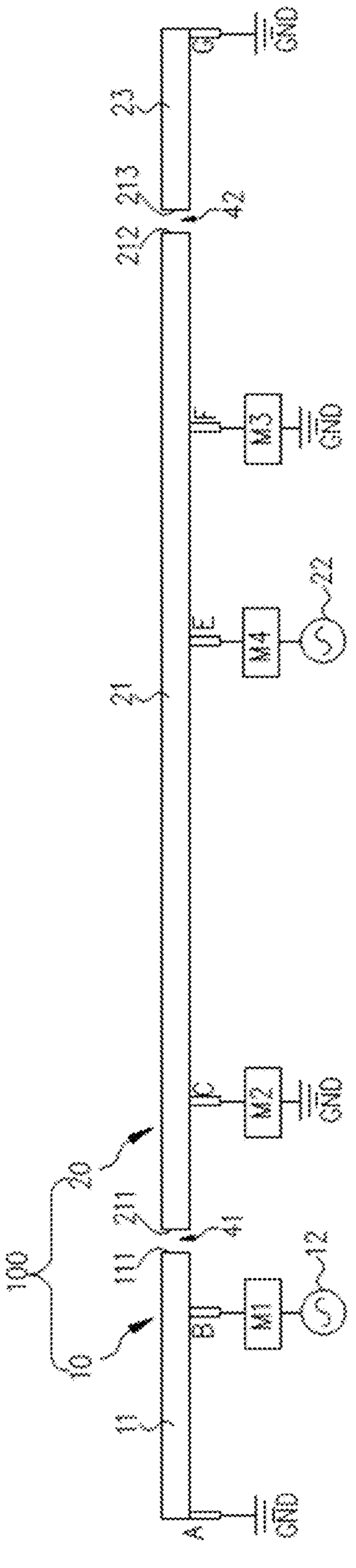
FIG. 9 is a schematic structural diagram of a second type of antenna assembly according to an implementation of the disclosure.

Optionally, referring to FIG. 9, the first radiator 11 is in a strip shape. The first radiator 11 includes a first ground end A, a first coupling end 111, and a first feeding point B located between the first ground end A and the first coupling end 111. The first ground end A and the first coupling terminal 111 are opposite ends of the first radiator 11. The first ground end A is grounded, and specifically, the first ground end A is electrically connected to the reference ground GND of the antenna assembly 100 or electrically connected to the reference ground GND of the electronic device 1000. The first feeding point B is a position where a signal is fed into the first radiator 11.

The first coupling end 111 is an end of the first radiator 11 where the first coupling gap 41 if formed.

Please refer to FIG. 9, the first antenna 10 further includes a first matching circuit M1, and one end of the first matching circuit M1 is electrically connected to the first signal source 12. The other end of the first matching circuit M1 is electrically connected to the first feeding point B.

Specifically, referring to FIG. 9, the first signal source 12 is configured to generate or transmit an excitation signal. The first matching circuit M1 is configured to filter the clutter in the excitation signal transmitted by the first signal source 12, and transfer the excitation signal to the first radiator 11, so that the first radiator 11 generates the third sub-resonant mode c, the fourth sub-resonant mode d, and the fifth sub-resonant mode e under excitation of the excitation signal. When the first radiator 11 generates a resonant mode, it indicates that the first radiator 11 has a better T/R efficiency at a certain resonant frequency, and further indicates that the first radiator 11 has a better T/R efficiency in a certain band range with the resonant frequency as a central frequency, in other words, the first radiator 11 can support the above band range under action of the first signal source 12.

Please refer to FIG. 8 and FIG. 9 together, the first radiator 11 between the first ground end A and the first coupling end 111 is configured to generate the third sub-resonant mode c under action of the first signal source 12. Specifically, an impedance of the first matching circuit M1 is low impedance with respect to the resonant frequency of the third sub-resonant mode c. The first matching circuit M1 excites, with a low impedance feed, the first radiator 11 between the first ground end A and the first coupling end 111 to generate a ¼ wavelength resonant mode. The ¼ wavelength resonant mode is also a ground state resonant mode. This mode correspondingly has relatively high T/R efficiency. In this case, the effective electrical length of the first radiator 11 between the first ground end A and the first coupling end 111 is ¼ of the wavelength corresponding to the resonant frequency of the third sub-resonant mode c, or, under the tuning of the matching circuit, the equivalent effective electrical length of the first radiator 11 between the first ground end A and the first coupling end 111 is ¼ of the wavelength corresponding to the resonant frequency of the third sub-resonant mode c. In this way, the third sub-resonant mode c generated by the first radiator 11 has higher T/R efficiency, and the antenna assembly 100 has better performance in a band with the resonant frequency of the third sub-resonant mode c as the central frequency.

Please refer to FIG. 8 and FIG. 9 together, the first radiator 11 between the first feeding point B and the first coupling end 111 is configured to generate the fourth sub-resonant mode d under action of the first signal source 12. Specifically, the impedance of the first matching circuit M1 is low impedance with respect to the resonant frequency of the fourth sub-resonant mode d. The first matching circuit M1 excites, with a low impedance feed, the first radiator 11 between the first feeding point B and the first coupling end 111 to generate a ¼ wavelength resonant mode. The ¼ wavelength resonant mode is also a ground state resonant mode, which correspondingly has high T/R efficiency. In this case, the effective electrical length of the first radiator 11 between the first feeding point B and the first coupling end 111 is ¼ of the wavelength corresponding to the resonant frequency of the fourth sub-resonant mode d, or, under the tuning of the matching circuit, the equivalent effective electrical length of the first radiator 11 between the first feeding point B and the first coupling end 111 is ¼ of the wavelength corresponding to the resonant frequency of the fourth sub-resonant mode d. In this way, the fourth sub-resonant mode d generated by the first radiator 11 has higher T/R efficiency, and the antenna assembly 100 has better performance in a band with the resonant frequency of the fourth sub-resonant mode d as the central frequency.

Please refer to FIG. 8 and FIG. 9 together, the first radiator 11 between the first ground end A and the first coupling terminal 111 generates the fifth sub-resonant mode e under a capacitive coupling feed effect of the first signal source 12. Specifically, the resonant frequency of the impedance of the first matching circuit M1 with respect to that of the fifth sub-resonant mode e is high impedance, and the first matching circuit M1 excites, with high impedance feed, the first radiator 11 between the first ground end A and the first coupling terminal 111 to generate a ⅛ wavelength resonant mode. In this case, the effective electrical length of the first radiator 11 between the first ground end A and the first coupling end 111 is ⅛ of the wavelength corresponding to the resonant frequency of the fifth sub-resonant mode e, or, under the tuning of the matching circuit, the equivalent effective electrical length of the first radiator 11 between the first ground end A and the first coupling end 111 is ⅛ of the wavelength corresponding to the resonant frequency of the fifth sub-resonant mode e. In this way, the fifth sub-resonant mode e generated by the first radiator 11 has higher T/R efficiency, and the antenna assembly 100 has better performance in a band with the resonant frequency of the fifth sub-resonant mode e as a central frequency. A ⅛ wavelength resonant mode is excited on the first radiator 11 between the first ground end A and the first coupling end 111, so that a relatively small band is excited on the small-sized first radiator 11, thereby further expanding a bandwidth.

The first radiator 11 generates the third sub-resonant mode c, the fourth sub-resonant mode d, and the fifth sub-resonant mode e under excitation of the first signal source 12, multiple resonant modes are generated by one radiator, and the resonant modes have different frequencies. A band with a wide bandwidth can be formed on a small-sized antenna through carrier aggregation of these resonant modes, thereby the first antenna 10 can support multiple different types of network communication signals.

Please refer to FIG. 9, the second radiator 21 includes a second coupling end 211, a third coupling end 212, and a first resonant point C, a second feeding point E, and a second resonant point F that are disposed between the second coupling end 211 and the third coupling end 212 in sequence.

Please refer to FIG. 9, the third radiator 23 includes a fourth coupling end 213 and a second ground end G, where the second ground end G is grounded.

The second coupling end 211 is an end of the second radiator 21 where the first coupling gap 41 is formed. The second radiator 21 is in a long strip shape. The second coupling end 211 and the third coupling end 212 are opposite ends of the second radiator 21. The first coupling end 111 and the second coupling end 211 are opposite to each other and spaced apart with the first coupling gap 41. The third coupling end 212 is an end where the second coupling gap 42 is formed. The second coupling gap 42 is formed between the third coupling end 212 and the fourth coupling end 213. The second feeding point E is a position where a signal is fed into the second radiator 21.

Please refer to FIG. 9, the second antenna 20 further includes a second matching circuit M2, a third matching circuit M3, and a fourth matching circuit M4. One end of the second matching circuit M2 is grounded, and the other end of the second matching circuit M2 is electrically connected to the first resonant point C. One end of the third matching circuit M3 is grounded, and the other end of the third matching circuit M3 is electrically connected to the second resonant point F. One end of the fourth matching circuit M4 is electrically connected to the second signal source 22, and the other end of the fourth matching circuit M4 is electrically connected to the second feeding point E.

In this implementation, referring to FIG. 8 and FIG. 9 together, because the first radiator 11 and the second radiator 21 are in capacitive coupling through the first coupling gap 41, the excitation energy of the first signal source 12 is transferred to the second radiator 21 through the first radiator 11, and the second radiator 21 between the first resonant point C and the second coupling end 211 generates the first sub-resonant mode a under excitation through the coupling of the first radiator 11. Specifically, the impedance of the first matching circuit M1 is low impedance with respect to the resonant frequency of the first sub-resonant mode a, and the second radiator 21 between the first resonant point C and the second coupling end 211 is excited with a low impedance feed to generate a ¼ wavelength resonant mode, where the ¼ wavelength resonant mode is also a ground state resonant mode, and the mode correspondingly has relatively high T/R efficiency. In this case, the impedance of the second matching circuit M2 is in a low impedance state with respect to the frequency of the first sub-resonant mode a, so that the signal of the first sub-resonant mode a passes through the second matching circuit M2 to the ground with low impedance. The effective electrical length of the second radiator 21 between the first resonant point C and the second coupling end 211 is ¼ of the wavelength corresponding to the resonant frequency of the first sub-resonant mode a, or, under the tuning of the matching circuit, the equivalent effective electrical length of the second radiator 21 between the first resonant point C and the second coupling end 211 is ¼ of the wavelength corresponding to the resonant frequency of the first sub-resonant mode a. In this way, the first sub-resonant mode a generated by the second radiator 21 has high T/R efficiency, and the antenna assembly 100 has good performance in a band with the resonant frequency of the first sub-resonant mode a as the central frequency.

In this implementation, referring to FIG. 8 and FIG. 9 together, because the first radiator 11 and the second radiator 21 are in capacitive coupling through the first coupling gap 41, the excitation energy of the first signal source 12 is transferred to the second radiator 21 through the first radiator 11, and the second radiator 21 between the second resonant point F and the third coupling end 212 generates the second sub-resonant mode b under excitation through the coupling of the first radiator 11. Specifically, the impedance of the first matching circuit M1 is low impedance relative to the resonant frequency of the second sub-resonant mode b, and the second radiator 21 between the second resonant point F and the third coupling end 212 is excited with low impedance feed to generate a ¼ wavelength resonant mode, where the ¼ wavelength resonant mode is also a ground state resonant mode, and the mode correspondingly has high T/R efficiency. In this case, the impedance of the third matching circuit M3 is in a low impedance state relative to the frequency of the second sub-resonant mode b, so that the signal of the second sub-resonant mode b passes through the third matching circuit M3 to the ground with low impedance. The effective electrical length of the second radiator 21 between the second resonant point F and the third coupling end 212 is ¼ of the wavelength corresponding to the resonant frequency of the second sub-resonant mode b, or, under the tuning of the matching circuit, the equivalent effective electrical length of the second radiator 21 between the second resonant point F and the third coupling end 212 is ¼ of the wavelength corresponding to the resonant frequency of the second sub-resonant mode b. In this way, the second sub-resonant mode b generated by the second radiator 21 has higher T/R efficiency, and the antenna assembly 100 has better performance in a band with the resonant frequency of the second sub-resonant mode b as the central frequency.

The part of the second radiator 21 between the second coupling end 211 and the first resonant point C and the part of the second radiator 21 between the second resonant point F and the third coupling end 212 may be used by the first antenna 10 when transmitting and receiving a middle high-band and ultra high-band, as such, the first antenna 10 and the second antenna 20 are integrated. Compared with a non-integrated antenna, the size of the radiator in the antenna assembly 100 is greatly reduced, it is beneficial to the miniaturization of the electronic device 1000. The described five resonant modes are generated by the first radiator 11 and the second radiator 21, as a result, the bandwidth of transmitting/receiving the middle high-ultra high-frequency signal by the first antenna 10 is greatly increased.

Specifically, the second signal source 22 is configured to generate or transmit an excitation signal, and the fourth matching circuit M4 is configured to filter the clutter in the excitation signal transmitted by the second signal source 22 and transmit the excitation signal to the second radiator 21. The second radiator 21 and the third radiator 23 are in capacitive coupling through the second coupling gap 42, and the second radiator 21 and the third radiator 23 are configured to generate a resonant mode under excitation of the excitation signal.

The second radiator 21 is configured to generate at least one resonant mode under excitation of the second signal source 22, where a band covered by the resonant mode generated by the second radiator 21 under excitation of the second signal source 22 is less than 1000 MHz. In other words, the second radiator 21 covers a low band when excited by the second signal source 22.

In this implementation, the second radiator 21 has two functions, can serve as a radiator of the first antenna 10 to transmit and receive a middle high-ultra high-frequency signal, and can also serve as a radiator of the second antenna 20 to transmit and receive a low-frequency signal, thereby increasing the utilization rate of the second radiator 21 and further reducing the overall size of the antenna assembly 100.

Figure 10:
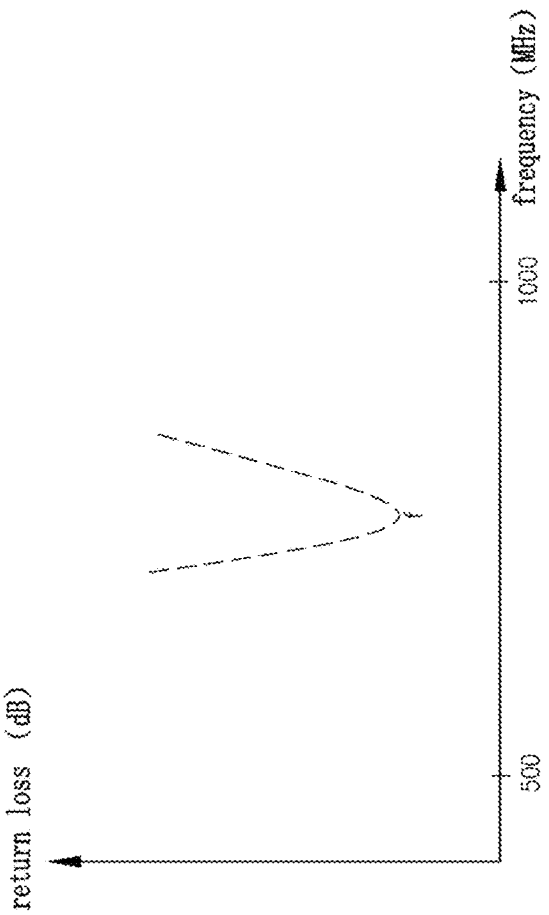
FIG. 10 is a schematic diagram of a sixth sub-resonant mode according to an implementation of the disclosure.

Optionally, referring to FIG. 10, the second radiator 21 between the first resonant point C and the third coupling end 212 is configured to generate at least one resonant mode under excitation of the second signal source 22. For ease of description, the resonant mode generated by the second radiator 21 between the first resonant point C and the third coupling end 212 under excitation of the second signal source 22 is defined as a sixth sub-resonant mode f.

Specifically, the impedance of the fourth matching circuit M4 is low impedance with respect to the resonant frequency of the sixth sub-resonant mode f, and the second radiator 21 between the first resonant point C and the third coupling end 212 is excited with the low impedance feed to generate a ¼ wavelength resonant mode, where the ¼ wavelength resonant mode is also a ground state resonant mode, and the mode correspondingly has high T/R efficiency. In this case, the impedance of the second matching circuit M2 is in a low impedance state with respect to the frequency of the sixth sub-resonant mode f, so that the signal of the sixth sub-resonant mode f passes through the second matching circuit M2 to the ground with low impedance. The effective electrical length of the second radiator 21 between the first resonant point C and the third coupling end 212 is ¼ of the wavelength corresponding to the resonant frequency of the sixth sub-resonant mode f, or, under the tuning of the matching circuit, the equivalent effective electrical length of the second radiator 21 between the first resonant point C and the third coupling end 212 is ¼ of the wavelength corresponding to the resonant frequency of the sixth sub-resonant mode f. In this way, the sixth sub-resonant mode f generated by the second radiator 21 has higher T/R efficiency, and the antenna assembly 100 has better performance in a band with the resonant frequency of the sixth sub-resonant mode f as the central frequency.

Figure 11:
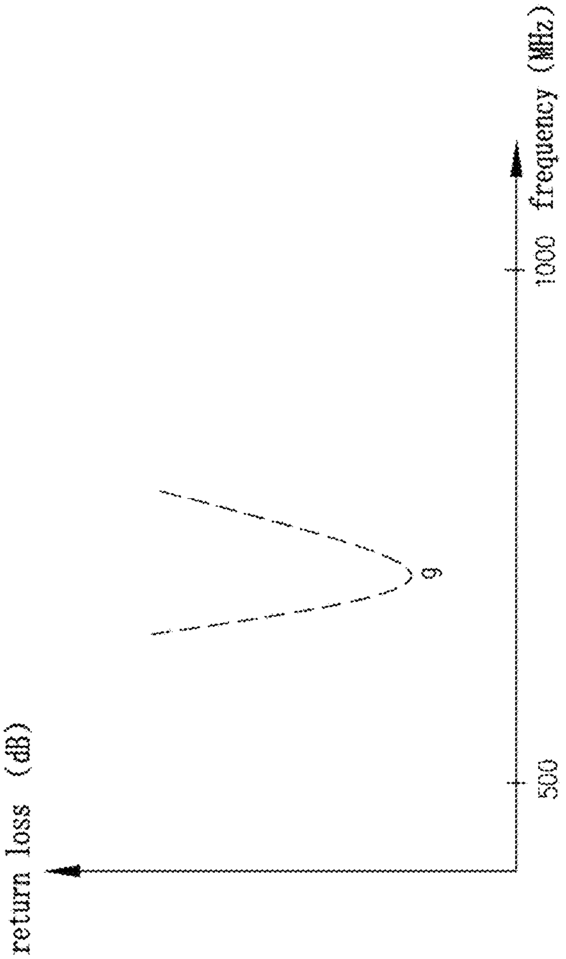
FIG. 11 is a schematic diagram of a seventh sub-resonant mode according to an implementation of the disclosure.

Optionally, referring to FIG. 11, the second radiator 21 between the second resonant point F and the second coupling end 211 is configured to generate at least one resonant mode under excitation of the second signal source 22. For ease of description, the resonant mode generated by the second radiator 21 between the second resonant point F and the second coupling end 211 under excitation of the second signal source 22 is defined as a seventh sub-resonant mode g.

Specifically, the impedance of the fourth matching circuit M4 is low impedance relative to the resonant frequency of the seventh sub-resonant mode g, and the second radiator 21 between the second resonant point F and the second coupling end 211 is excited with a low impedance feed to generate a ¼ wavelength resonant mode, where the ¼ wavelength resonant mode is also a ground state resonant mode, and the mode has relatively high T/R efficiency. In this case, the impedance of the third matching circuit M3 is in a low impedance state with respect to the frequency of the seventh sub-resonant mode g, so that the signal of the seventh sub-resonant mode g passes through the third matching circuit M3 to the ground with low impedance. The effective electrical length of the second radiator 21 between the second resonant point F and the second coupling end 211 is ¼ of the wavelength corresponding to the resonant frequency of the seventh sub-resonant mode g, or, under the tuning of the matching circuit, the equivalent effective electrical length of the second radiator 21 between the second resonant point F and the second coupling end 211 is ¼ of the wavelength corresponding to the resonant frequency of the seventh sub-resonant mode g. In this way, the seventh sub-resonant mode g generated by the second radiator 21 has higher T/R efficiency, and the antenna assembly 100 has better performance in a band with the resonant frequency of the seventh sub-resonant mode g as the central frequency.

Optionally, the antenna assembly 100 may be configured to control the second radiator 21 to generate one of the sixth sub-resonant mode f and the seventh sub-resonant mode g to support a low band. where the resonant frequency of the sixth sub-resonant mode f may be greater than, less than, or equal to the resonant frequency of the seventh sub-resonant mode g.

Figure 12:
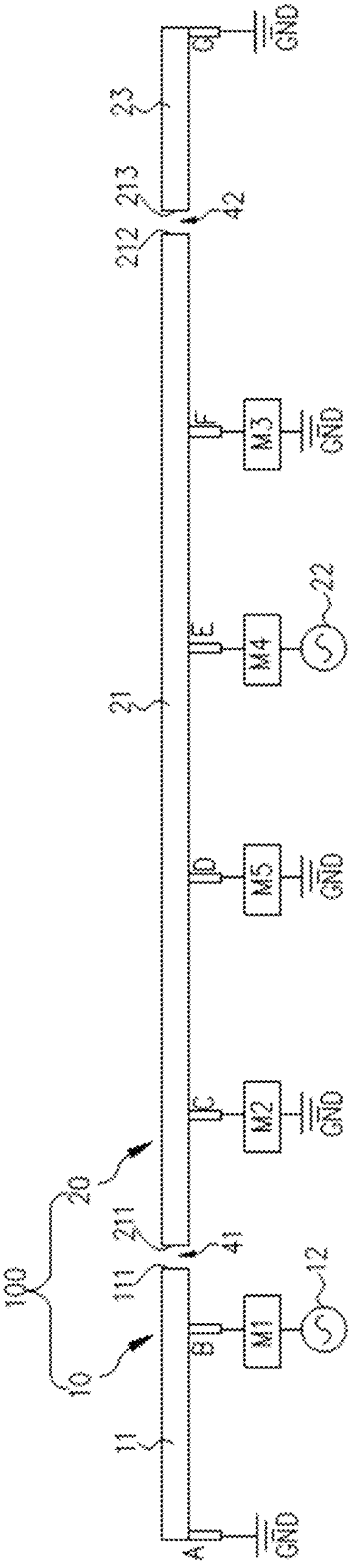
FIG. 12 is a schematic structural diagram of a third type of antenna assembly according to an implementation of the disclosure.

Please refer to FIG. 12, the second radiator 21 further includes a frequency tuning point D, where the frequency tuning point D is located between the first resonant point C and the second feeding point E. The second antenna 20 further includes a fifth matching circuit M5. One end of the fifth matching circuit M5 is grounded, and the other end of the fifth matching circuit M5 is electrically connected to the frequency tuning point D. At least one of the second matching circuit M2, the third matching circuit M3, the fifth matching circuit M5, and the fourth matching circuit M4 is configured to adjust a resonant frequency of a resonant mode generated by the second radiator 21 under excitation of the second signal source 22. In this implementation, any one of the second matching circuit M2, the third matching circuit M3, the fifth matching circuit M5, and the fourth matching circuit M4 may be configured to adjust the resonant frequency of the resonant mode generated by the second radiator 21 under excitation of the second signal source 22, so that the resonant frequency of the resonant mode generated by the second radiator 21 under excitation of the second signal source 22 changes towards a low band or changes towards a high band, so that the resonant frequency of the resonant mode generated by the second radiator 21 under excitation of the second signal source 22 can cover a low band of 500 MHz to 1000 MHz in different time periods, to cover B28, B20, B5, B8, N28, N20, N5, N8 and other application bands.

Figure 13:
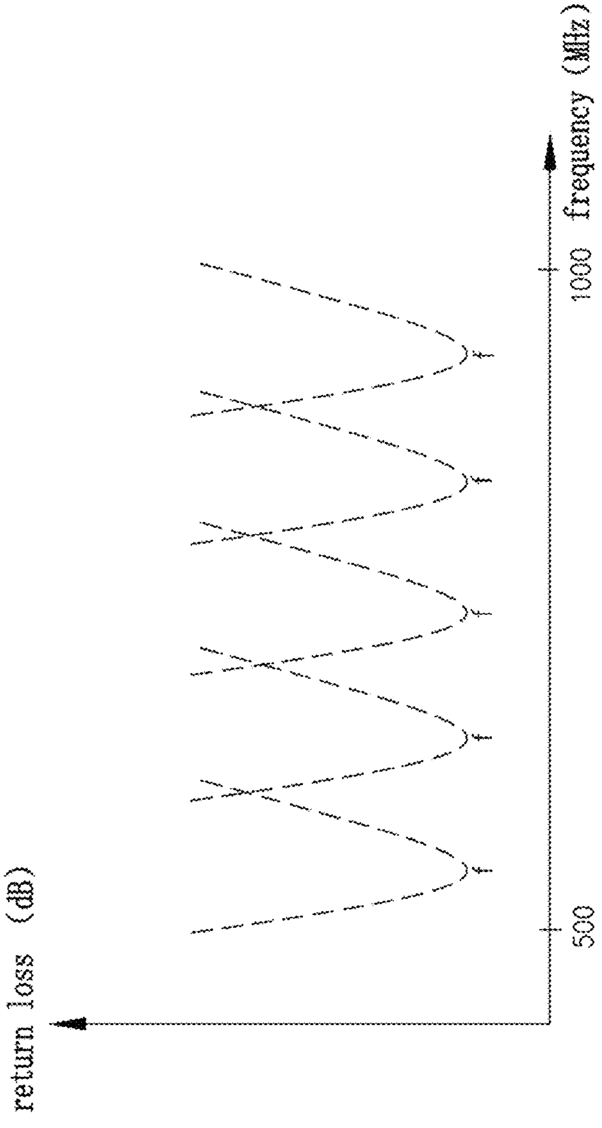
FIG. 13 is a schematic diagram of movement of a sixth sub-resonant mode to different bands according to an implementation of the disclosure.

For example, referring to FIG. 13, the resonant frequency of the resonant mode generated by the second radiator 21 under excitation of the second signal source 22 is 780 MHz, which may support a band of 740 MHz-820 MHz. By adjusting any one of the second matching circuit M2, the third matching circuit M3, the fifth matching circuit M5, and the fourth matching circuit M4, the sixth sub-resonant mode f generated by the second radiator 21 under excitation of the second signal source 22 can support a band of 500 MHz-580 MHz, a band of 580 MHz-660 MHz, a band of 660 MHz-740 MHz, a band of 820 MHz-900 MHz, a band of 900 MHz-980 MHz, etc.

In addition, a tuning manner for the high-frequency signal generated by the first antenna 10 includes, but is not limited to, an implementation in which the first sub-resonant mode a may be tuned by the second matching circuit M2 and the second sub-resonant mode b may be tuned by the third matching circuit M3. The third sub-resonant mode c, the fourth sub-resonant mode d, and the fifth sub-resonant mode e may be tuned by the first matching circuit M1.

The first matching circuit M1 to the fifth matching circuit M5 all have the function of changing the impedance of the radiator, and the structures of the first matching circuit M1 to the fifth matching circuit M5 are not specifically limited in the disclosure. Optionally, the first matching circuit M1 to the fifth matching circuit M5 each include, but are not limited to, capacitors, inductors, and resistors that are connected in series and/or in parallel. Specifically, the first matching circuit M1 may include multiple branches formed by a capacitor, an inductor, and a resistor that are connected in series and/or in parallel and a switch that controls on/off of the multiple branches. By controlling the on-off of different branches, frequency selection parameters (including a resistance value, an inductance value, and a capacitance value) of the first matching circuit M1 can be adjusted, and then the impedance of the first matching circuit M1 is adjusted, so that the transmission impedance of the feeding branch matches the impedance of the first radiator 11, thereby improving the T/R efficiency of the first radiator 11. At the same time, the first matching circuit M1 can also adjust the impedance thereof to adjust the effective electrical length of the first radiator 11, and then adjust the resonant frequency of the resonant mode generated by the first radiator 11 to move towards a high frequency direction or a low frequency direction, so as to adjust the band range covered by the first radiator 11 and increase the supportable bandwidth range.

Furthermore, optionally, the first matching circuit M1 further includes an adjustable capacitor, and the adjustable capacitor can adjust the capacitance value thereof, and then adjust the impedance value of the first matching circuit M1, so that the transmission impedance of the feeding branch matches the impedance of the first radiator 11, thereby improving the T/R efficiency of the first radiator 11; and adjust a resonant frequency of a resonant mode generated by the first radiator 11 to move towards a high frequency direction or a low frequency direction, so as to adjust a band range covered by the first radiator 11, thereby increasing a supportable bandwidth range.

Similarly, for structures of the second matching circuit M2 to the fifth matching circuit M5, reference may be made to structures and adjustment manners of the first matching circuit M1, so as to achieve impedance matching and improve T/R efficiency of the antenna assembly 100, and a band range covered by the radiator can be adjusted, so as to increase a supportable bandwidth range. Details are not redundantly described herein.

For the first matching circuit M1 and the fourth matching circuit M4, the first matching circuit M1 and the fourth matching circuit M4 also have a filtering function, so as to increase the isolation between the first antenna 10 and the second antenna 20. For example, the first signal source 12 and the second signal source 22 are the same signal source. The first matching circuit M1 is provided with a high frequency band-pass branch which is electrically connected between the first signal source 12 and the first radiator 11, so as to transfer the high-frequency signal from the first signal source 12 to the first radiator 11. The fourth matching circuit M4 is provided with a low frequency band-pass branch which is electrically connected between the second signal source 22 and the second radiator 21, so as to transfer the low-frequency signal from the second signal source 22 to the second radiator 21. Since the first matching circuit M1 and the second matching circuit M2 respectively filter out the high-frequency signal and the low-frequency signal, and the high-frequency signal and the low-frequency signal have a good isolation due to the frequency difference, so that the first antenna 10 and the second antenna 20 has small mutual interference and high isolation.

Further, the fourth matching circuit M4 may also be provided with a clutter filter circuit, so as to reduce interference of the clutter on the second antenna 20 and the first antenna 10.

Figure 14:
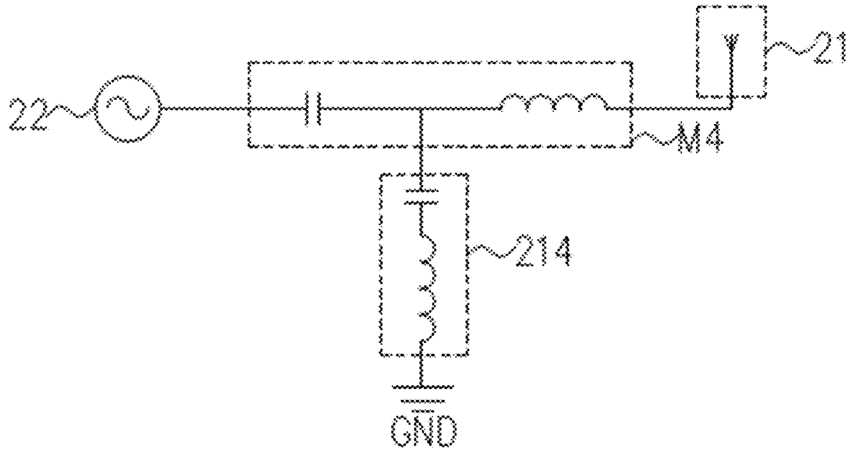
FIG. 14 is a schematic structural diagram of a radio frequency link from a second signal source to a second radiator according to an implementation of the disclosure.

Specifically, referring to FIG. 14, the second antenna 20 further includes a middle-high frequency band-pass branch 214, where one end of the middle-high frequency band-pass branch 214 is grounded. The other end of the middle-high frequency band-pass branch 214 is electrically connected to a fourth matching circuit M4. The middle-high frequency band-pass branch 214 includes an inductor and a capacitor which are arranged in series. One end of the capacitor is electrically connected to the fourth matching circuit M4, the other end of the capacitor is electrically connected to one end of the inductor, and the other end of the inductor is grounded. The middle-high frequency band-pass branch 214 connected in parallel to the ground is disposed in the fourth matching circuit M4 to filter out the high frequency clutter in the second signal source 22, so that the second antenna 20 is not interfered by the high frequency clutter, and the high frequency clutter in the second antenna 20 will not interfere with the first signal source 12, thereby improving the isolation between the first antenna 10 and the second antenna 20.

Accordingly, the first matching circuit M1 may be provided with a grounded low frequency band-pass branch to filter out the low frequency clutter in the first signal source 12, so as to prevent the low frequency clutter from interfering with the signal T/R of the first antenna 10, and at the same time, prevent the low frequency clutter from interfering with the signal T/R of the second antenna 20, thereby increasing the isolation between the first antenna 10 and the second antenna 20.

Please refer to FIG. 15-FIG. 22 together, FIG. 15-FIG. 22 are schematic diagrams of the first matching circuit M1 according to various implementations. The first matching circuit M1 includes one or more of the following circuits.

Figure 15:
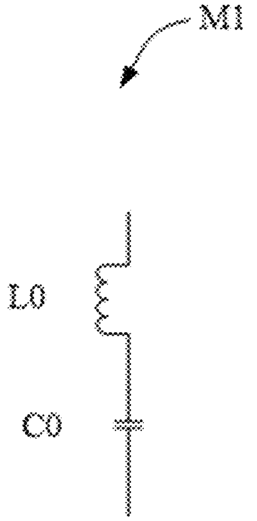
FIG. 15 is a schematic structural diagram of a first type of first matching circuit according to an implementation of the disclosure.

Please refer to FIG. 15, the first matching circuit M1 includes a band-pass circuit formed by an inductor L0 and a capacitor C0 connected in series.

Figure 16:
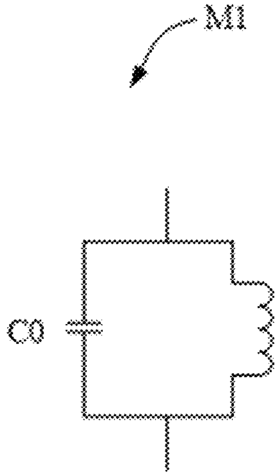
FIG. 16 is a schematic structural diagram of a second type of first matching circuit according to an implementation of the disclosure.

Please refer to FIG. 16, the first matching circuit M1 includes a band-stop circuit formed by an inductor L0 and a capacitor C0 connected in parallel.

Figure 17:
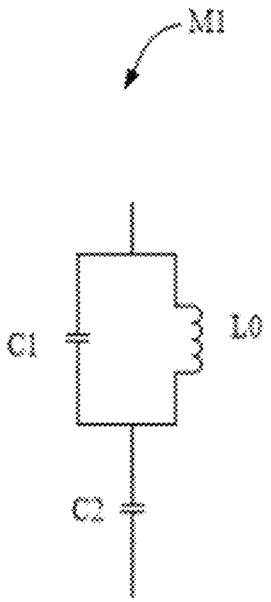
FIG. 17 is a schematic structural diagram of a third type of first matching circuit according to an implementation of the disclosure.

Please refer to FIG. 17, the first matching circuit M1 includes an inductor L0, a first capacitor C1, and a second capacitor C2. The inductor L0 is connected in parallel to the first capacitor C1, and the second capacitor C2 is electrically connected to a point where the inductor L0 is electrically connected to the first capacitor C1.

Figure 18:
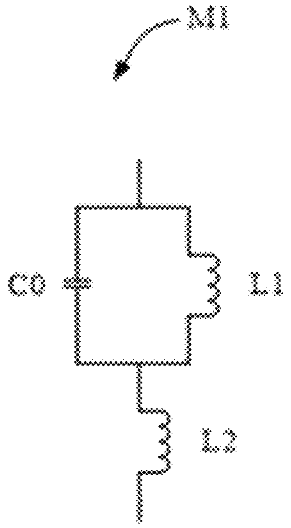
FIG. 18 is a schematic structural diagram of a fourth type of first matching circuit according to an implementation of the disclosure.

Please refer to FIG. 18, the first matching circuit M1 includes a capacitor C0, a first inductor L1, and a second inductor L2. The capacitor C0 is connected in parallel to the first inductor L1, and the second inductor L2 is electrically connected to a point where the capacitor C0 is electrically connected to the first inductor L1.

Figure 19:
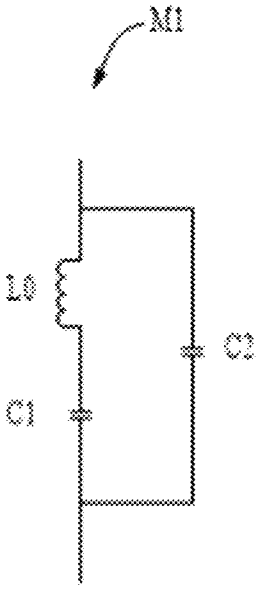
FIG. 19 is a schematic structural diagram of a fifth type of first matching circuit according to an implementation of the disclosure.

Please refer to FIG. 19, the first matching circuit M1 includes an inductor L0, a first capacitor C1, and a second capacitor C2. The inductor L0 is connected in series with the first capacitor C1, one end of the second capacitor C2 is electrically connected to a first end of the inductor L0 that is not connected to the first capacitor C1, and the other end of the second capacitor C2 is electrically connected to one end of the first capacitor C1 that is not connected to the inductor L0.

Figure 20:
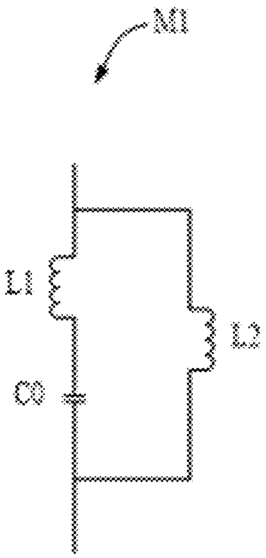
FIG. 20 is a schematic structural diagram of a sixth type of first matching circuit according to an implementation of the disclosure.

Please refer to FIG. 20, the first matching circuit M1 includes a capacitor C0, a first inductor L1, and a second inductor L2. The capacitor C0 is connected in series to the first inductor L1, one end of the second inductor L2 is electrically connected to one end of the capacitor C0 that is not connected to the first inductor L1, and the other end of the second inductor L2 is electrically connected to one end of the first inductor L1 that is not connected to the capacitor C0.

Figure 21:
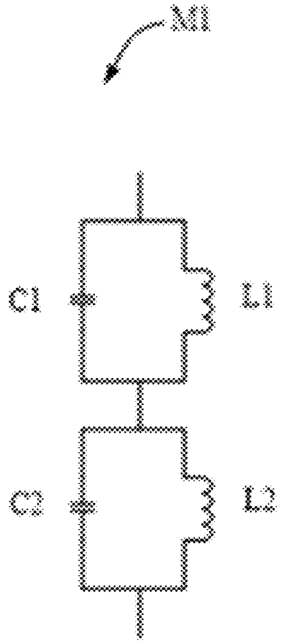
FIG. 21 is a schematic structural diagram of a seventh type of first matching circuit according to an implementation of the disclosure.

Please refer to FIG. 21, the first matching circuit M1 includes a first capacitor C1, a second capacitor C2, a first inductor L1, and a second inductor L2. The first capacitor C1 is connected in parallel to the first inductor L1, the second capacitor C2 is connected in parallel to the second inductor L2, and one end of the circuit formed by the second capacitor C2 and the second inductor L2 connected in parallel is electrically connected to one end of the circuit formed by the first capacitor C1 and the first inductor L1 connected in parallel.

Figure 22:
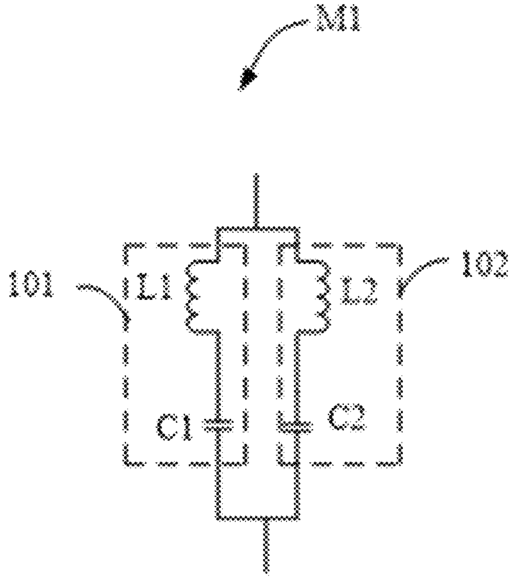
FIG. 22 is a schematic structural diagram of an eighth type of first matching circuit according to an implementation of the disclosure.

Please refer to FIG. 22, the first matching circuit M1 includes a first capacitor C1, a second capacitor C2, a first inductor L1, and a second inductor L2. The first capacitor C1 and the first inductor L1 are connected in series to form a first unit 101, the second capacitor C2 and the second inductor L2 are connected in series to form a second unit 102, and the first unit 101 and the second unit 102 are connected in parallel.

The first matching circuit M1 exhibits different band-pass and band-stop characteristics in different bands.

The antenna assembly 100 further includes a first controller 61. The first controller is configured to determine a radiation mode of the second radiator 21 according to whether the first coupling gap 41 and the second coupling gap 42 are in a free radiation scenario or a blocked radiation scenario. The free radiation scenario means that the first coupling gap 41 and the second coupling gap 42 are not blocked by a conductor or an object with static electricity. The blocked radiation scenario means that the first coupling gap 41 and the second coupling gap 42 are blocked by a conductor or an object with static electricity, for example, the first coupling gap 41 and the second coupling gap 42 are covered by the operator's hand.

The details are as follows.

The first controller is configured to determine, according to that the first coupling gap 41 is in the free radiation scenario and the second coupling gap 42 is in the blocked radiation scenario, that the second radiator 21 is in a first radiation mode, where in the first radiation mode, the first signal source 12 is configured to excite the second radiator 21 between the second resonant point F and the second coupling end 211 to generate at least one resonant mode.

The first controller is further configured to determine, according to that the first coupling gap 41 is in the blocked radiation scenario and the second coupling gap 42 is in the free radiation scenario, that the second radiator 21 is in a second radiation mode, where in the second radiation mode, the first signal source 12 is configured to excite the second radiator 21 between the first resonant point C and the third coupling end 212 to generate at least one resonant mode under excitation of the second signal source 22.

The first controller is further configured to determine that the second radiator 21 is in the first radiation mode or the second radiation mode when the first coupling gap 41 and the second coupling gap 42 are both in the free radiation scenario.

The disclosure does not limit the specific structure of the first controller controlling the second radiator 21 to switch the radiation mode. The following implementations are exemplified.

Figure 23:
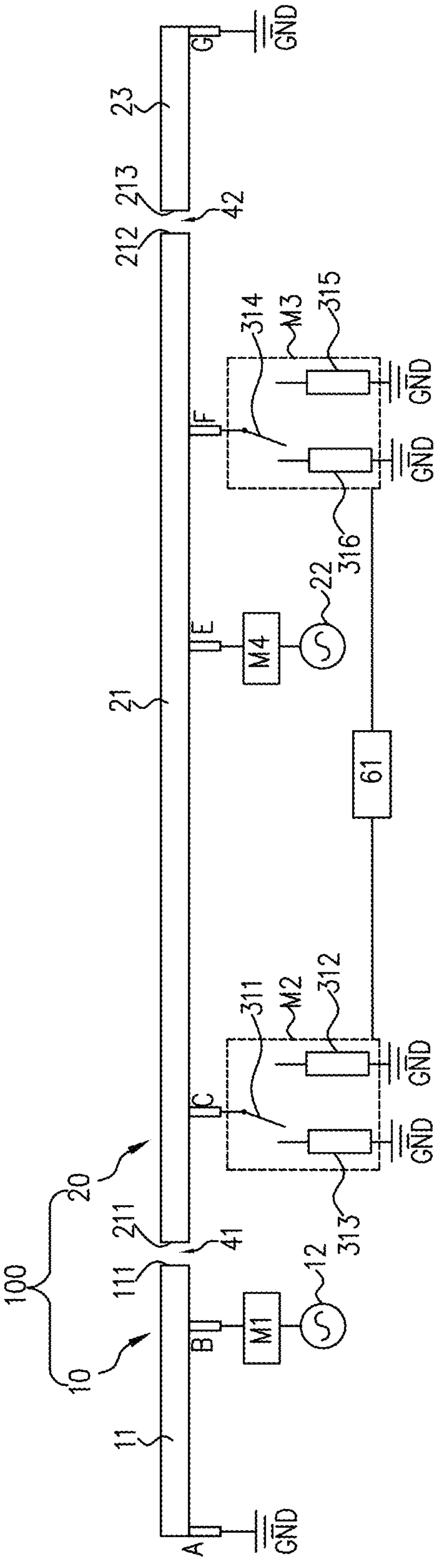
FIG. 23 is a schematic structural diagram of a fourth type of antenna assembly according to an implementation of the disclosure.

Please refer to FIG. 23, the second matching circuit M2 includes at least one first selection switch 311, a first high-impedance branch 312, and a first low-impedance branch 313. The first selection switch 311 is configured to select one of the first high-impedance branch 312 and the first low-impedance branch 313 to be electrically connected to the first resonant point C. The first selection switch 311 is a single-pole double-throw switch, a first end of the first selection switch 311 is electrically connected to the first resonant point C of the second radiator 21, a second end of the first selection switch 311 is electrically connected to one end of the first high-impedance branch 312, and the other end of the first high-impedance branch 312 is grounded, a third end of the first selection switch 311 is electrically connected to one end of the first low-impedance branch 313, and the other end of the first low-impedance branch 313 is grounded. The first controller is electrically connected to a control end of the first selection switch 311, so as to control the first selection switch 311 to select the first high-impedance branch 312 or the first low-impedance branch 313 to be electrically connected to the first resonant point C. Certainly, the first selecting switch 311 can further include two sub-switches, where one of the two sub-switches connects the first resonant point C to the first high-impedance branch 312 and the other one connects the first resonant point C to the first low-impedance branch 313. Definitely, the second matching circuit M2 can further include impedance branches.

The first high-impedance branch 312 has high impedance relative to the resonant frequency of the resonant mode generated by the second radiator 21 under excitation of the second signal source 22, and the first low-impedance branch 313 has low impedance relative to the resonant frequency of the resonant mode generated by the second radiator 21 under excitation of the second signal source 22.

For example, the first high-impedance branch 312 includes, but is not limited to, a large capacitor and the like. The first low-impedance branch 313 includes, but is not limited to, direct grounding, a small inductor, and the like.

Please refer to FIG. 23, the third matching circuit M3 includes at least one second selection switch 314, a second high-impedance branch 315, and a second low-impedance branch 316. The second selection switch 314 is configured to select one of the second high-impedance branch 315 and the second low-impedance branch 316 to be electrically connected to the second resonant point F. The second selection switch 314 is a single-pole double-throw switch, and a first end of the second selection switch 314 is electrically connected to the second resonant point F of the second radiator 21, a second end of the second selection switch 314 is electrically connected to one end of the second high-impedance branch 315, and the other end of the second high-impedance branch 315 is grounded, a third end of the second selection switch 314 is electrically connected to one end of the second low-impedance branch 316, and the other end of the second low-impedance branch 316 is grounded. The first controller is electrically connected to a control end of the second selection switch 314, so as to control the second selection switch 314 to select the second high-impedance branch 315 or the second low-impedance branch 316 to be electrically connected to the second resonant point F. Certainly, the second selection switch 314 can further include two sub-switches, where one of the two sub-switches connects the second resonant point F to the second high-impedance branch 315 and the other one connects the second resonant point F to the second low-impedance branch 316. Definitely, the second matching circuit M2 can further include other impedance branches.

The second high-impedance branch 315 has high impedance relative to the resonant frequency of the resonant mode generated by the second radiator 21 under excitation of the second signal source 22, and the second low-impedance branch 316 has low impedance relative to the resonant frequency of the resonant mode generated by the second radiator 21 under excitation of the second signal source 22.

For example, the first high-impedance branch 312 includes, but is not limited to, a large capacitor and the like, and the first low-impedance branch 313 includes, but is not limited to, direct grounding, a small inductor, and the like.

The first controller is electrically connected to the first selection switch 311 and the second selection switch 314. The first controller is configured to control, according to that the first coupling gap 41 is in the free radiation scenario and the second coupling gap 42 is in the blocked radiation scenario, the first selection switch 311 to connect the first high-impedance branch 312 to the first resonant point C, and control the second selection switch 314 to connect the second low-impedance branch 316 to the second resonant point F.

The first controller is further configured to control, according to that the first coupling gap 41 is in the blocked radiation scenario and the second coupling gap 42 is in the free radiation scenario, the first selection switch 311 to connect the first low-impedance branch 313 to the first resonant point C, and control the second selection switch 314 to connect the second high-impedance branch 315 to the second resonant point F.

In this implementation, the second antenna 20 has two paths to generate the low-frequency resonant mode: one is that the second signal source 22 excites the second radiator 21 between the first resonant point C and the third coupling end 212, this path does not involve the first coupling gap 41, and the other is that the second signal source 22 excites the second radiator 21 between the second resonant point F and the second coupling end 211, this path does not involve the second coupling gap 42.

When the antenna assembly 100 is applied to the electronic device 1000 and the radiator is disposed on the housing of the electronic device 1000, the operator may block the first coupling gap 41 or the second coupling gap 42 when holding the electronic device 1000. In the disclosure, when a first coupling gap 41 is blocked, the first controller controls the second signal source 22 to excite the second radiator 21 between the first resonant point C and the third coupling end 212 to generate the sixth sub-resonant mode f, so that the second antenna 20 can still excite the second radiator 21 to generate a low-frequency signal. For a high-frequency signal, since the first coupling gap 41 is blocked and the second coupling gap 42 can still work normally, the second sub-resonant mode b can still be generated, and the second sub-resonant mode b is tuned through the third matching circuit M3, so that the first coupling gap 41 of the antenna assembly 100 can still be used effectively in low frequency and middle high-ultra high frequency when being blocked. In the disclosure, when the second coupling gap 42 is blocked, the first controller controls the second signal source 22 to excite the second radiator 21 between the second resonant point F and the second coupling end 211 to generate the seventh sub-resonant mode g, so that the second antenna 20 can still excite the second radiator 21 to generate a low-frequency signal. For a high-frequency signal, because the second coupling gap 42 is blocked and the first coupling gap 41 can still work normally, therefore, the first sub-resonant mode a, the third sub-resonant mode c, the fourth sub-resonant mode d, and the fifth sub-resonant mode e may still be generated, the above resonant modes are tuned through the first and second matching circuits M1 and M2, so that the second coupling gap 42 of the antenna assembly 100 can still be used effectively in low frequency, middle high-ultra high frequency when being blocked.

The specific structure of the antenna assembly 100 is illustrated above by way of example, and in some implementations, the antenna assembly 100 is disposed in the electronic device 1000. The following describes an implementation in which the antenna assembly 100 is disposed in the electronic device 1000 in examples. For the electronic device 1000, the antenna assembly 100 is at least partially integrated on the housing 500 or fully received in the housing 500.

Please refer to FIG. 2, the housing 500 includes a frame 51 and a back cover 52. One side of the frame 51 surrounds and is connected a periphery of the back cover 52. The other side of the frame 51 surrounds and is connected to the periphery of the display screen, and the frame 51 includes multiple side edges connected end to end in turn.

When the electronic device 1000 is a mobile phone, the surface where the display screen is located is the front surface of the electronic device 1000, and the frame 51 forms four side surfaces of the electronic device 1000. When the user faces the front surface of the electronic device 1000, the electronic device 1000 has the upper, lower, left, and right surfaces, and the surface where the back cover 52 is located is the rear surface of the electronic device 1000.

Optionally, at least part of the radiator of the antenna assembly 100 is integrated with the frame 51. For example, the frame 51 is made of a metal material. The first radiator 11, the second radiator 21, the third radiator 23, and the frame 51 are integrated into one piece, and of course, the radiators may also be integrated into the back cover 52. In other words, the first radiator 11, the second radiator 21 and the third radiator 23 are integrated as part of the housing 500.

Figure 24:
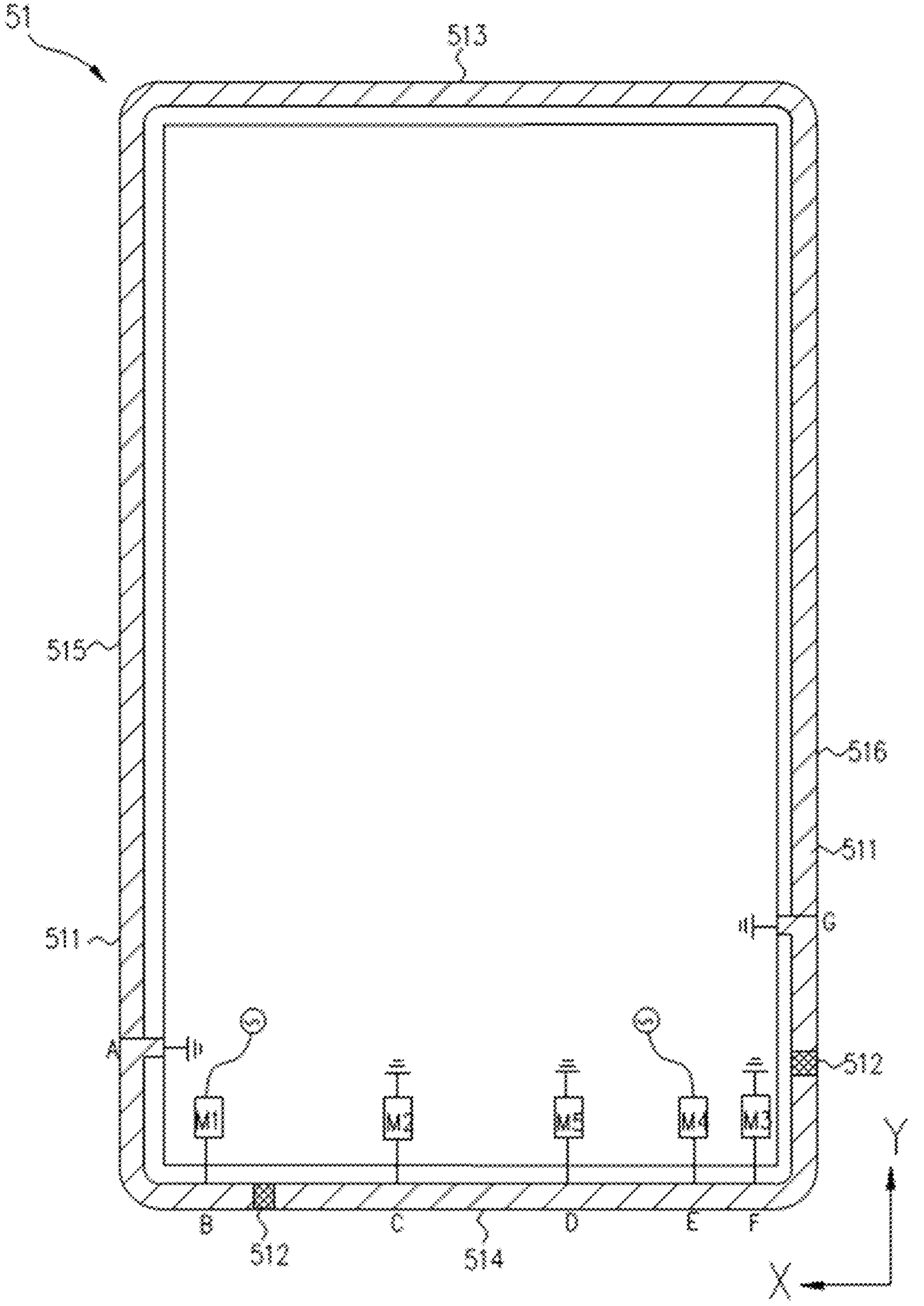
FIG. 24 is a schematic structural diagram of the third type of antenna assembly arranged in an electronic device according to an implementation of the disclosure.

Specifically, referring to FIG. 24, the frame 51 includes multiple metal segments 511 and an insulation segment 512 filled between two adjacent metal segments 511. The insulation segment 512 is used for insulating and connecting two adjacent metal segments 511.

The multiple metal segments 511 or parts of the metal segments 511 form the first radiator 23, the second radiator 21, and the third radiator 23 respectively, where the insulation segment 512 between the first radiator 11 and the second radiator 21 is filled in the first coupling gap 41, and the insulation segment 512 between the second radiator 21 and the third radiator 23 is filled in the second coupling gap 42.

Optionally, when the radiator is used as a carrier for sensing proximity of an electric field of a human body, an insulating film having a high transmittance for an electromagnetic wave may be disposed on a surface of the frame 51, and the film is used for forming a capacitor when the metal frame 51 is close to the skin of the human body and will not affect signal T/R of the antenna assembly 100.

Specifically, the reference ground GND, the first signal source 12, the second signal source 22, the first to fifth matching circuits M1-M5, etc. of the antenna assembly 100 are all arranged on a circuit board.

Optionally, the first radiator 11, the second radiator 21, and the third radiator 23 are formed on a surface of the frame 51. Specifically, the first radiator 11, the second radiator 21, and the third radiator 23 are formed on the inner surface of the frame 51 through processes such as laser direct structuring (LDS) and print direct structuring (PDS). In this implementation, the frame 51 may be made of a non-conductive material. The radiator may also be disposed on the back cover 52.

Alternatively, the first radiator 11, the second radiator 21, and the third radiator 23 are disposed on a flexible circuit board, and the flexible circuit board is attached to a surface of the frame 51. The first radiator 11, the second radiator 21, and the third radiator 23 may be integrated onto the flexible circuit board, and the flexible circuit board is attached to the inner surface of the middle frame by an adhesive or the like. In this implementation, the frame 51 may be made of a non-conductive material. The radiator may also be disposed on the inner surface of the back cover 52.

The specific position of the antenna assembly 100 on the frame 51 is not specifically limited in the disclosure, and the following implementations are exemplified.

Please refer to FIG. 24, two adjacent side edges in the multiple side edges of the frame 51 intersect, for example, the two adjacent side edges are perpendicular to each other. The first coupling gap 41 and the second coupling gap 42 are respectively disposed on two intersected side edges of the frame 51, or the first coupling gap 41 and the second coupling gap 42 are both disposed on the same side edge of the frame 51. The multiple side edges include a top edge 513 and a bottom edge 514 disposed opposite to each other, and a first side edge 515 and a second side edge 516 connected between the top edge 513 and the bottom edge 514. The top edge 513 is a side away from the ground when the operator holds the electronic device 1000 to face the front surface of the electronic device 1000, and the bottom edge 514 is a side facing the ground. The top edge 513 is parallel to and equal to the bottom edge 514, and the first side edge 515 is parallel to and equal to the second side edge 516. The length of the first side edge 515 is greater than the length of the top edge 513. The first coupling gap 41 and the second coupling gap 42 may be disposed respectively at the top edge 513 and the first side edge 515, the top edge 513 and the second side edge 516, the first side edge 515 and the bottom edge 514, or the bottom edge 514 and the second side edge 516. Certainly, the first coupling gap 41 and the second coupling gap 42 may also be disposed on the same edge, for example, at any one of the top edge 513, the bottom edge 514, the first side edge 515, and the second side edge 516.

In the foregoing description, the first coupling gap 41 and the second coupling gap 42 are respectively disposed on two adjacent edges of the frame 51, so as to ensure that the antenna assembly 100 can have high T/R performance when the user holds the electronic device 1000 in different holding manners.

Specifically, when the electronic device 1000 is held in a longitudinal direction by left hand, the first side edge 515 is blocked or shielded by the hand, and the first coupling gap 41 (or the second coupling gap 42) disposed on the first side edge 515 may be blocked. Because the second coupling gap 42 (or the first coupling gap 41) is disposed on the top edge 513 or the bottom edge 514, the second coupling gap 42 (or the first coupling gap 41) is not blocked at this time. In combination with the control method of the antenna assembly 100 when the first coupling gap 41 (or the second coupling gap 42) is blocked, the low-frequency radiation of the antenna assembly 100 can be switched to the first resonant point C—the second coupling gap 42 (or the first coupling gap 41). In this way, the left hand holding in the longitudinal direction does not affect the low-frequency T/R, and the second sub-resonant mode b in the high-frequency T/R can still work normally. This ensures that the antenna assembly 100 also has good performance in high-frequency T/R.

When the electronic device 1000 is held in a vertical direction by the right hand, the second side edge 516 is blocked or shielded by the hand, and the first coupling gap 41 (or the second coupling gap 42) disposed on the first side edge 515 may be blocked. Because the second coupling gap 42 (or the first coupling gap 41) is disposed on the top edge 513 or the bottom edge 514, the second coupling gap 42 (or the first coupling gap 41) is not blocked at this time. In combination with the control method of the antenna assembly 100 when the first coupling gap 41 (or the second coupling gap 42) is blocked, the low-frequency radiation of the antenna assembly 100 can be switched to the first resonant point C—the second coupling gap 42 (or the first coupling gap 41). In this way, the left hand holding in the longitudinal direction does not affect the low-frequency T/R, and the second sub-resonant mode b in the high-frequency T/R can still work normally. This ensures that the antenna assembly 100 also has good performance in high frequency T/R.

When the electronic device 1000 is laterally held by both hands, both the top edge 513 and the bottom edge 514 are blocked by the hands. The first coupling gap 41 (or the second coupling gap 42) disposed on the top edge 513 or the bottom edge 514 is blocked, while the second coupling gap 42 (or the first coupling gap 41) disposed on the first side edge 515 or the second side edge 516 is not blocked. In combination with the control method of the antenna assembly 100 when the first coupling gap 41 (or the second coupling gap 42) is blocked, the low-frequency radiation of the antenna assembly 100 can be switched to the first resonant point C—the second coupling gap 42 (or the first coupling gap 41). In this way, both hands holding the electronic device 1000 laterally does not affect the low-frequency T/R, and the second sub-resonant mode b in the high-frequency T/R can still work normally. This ensures that the antenna assembly 100 also has good performance in high frequency T/R. It can be seen from the foregoing description that, the first coupling gap 41 and the second coupling gap 42 are respectively disposed on two adjacent edges of the frame 51, so as to ensure that the antenna assembly 100 can have high T/R performance when the user holds the electronic device 1000 in different holding manners.

In an implementation, the frame 51 is made of a metal material. The first coupling gap 41 is disposed on the bottom edge 514 and close to the first side edge 515. The second coupling gap 42 is disposed on the second side edge 516. The insulation medium is filled in both the first coupling gap 41 and the second coupling gap 42. At least part of the first radiator 11 is disposed on the bottom edge 514. One part of the second radiator 21 is disposed on the bottom edge 514, and the other part of the second radiator 21 is disposed on the second side edge 516. The third radiator 23 is disposed on the second side edge 516.

The first side edge 515 is grounded at a position near the bottom edge 514, so as to form a first ground end A of the first radiator 11. The metal frame 51 between the first ground end A and the first coupling gap 41 forms the first radiator 11, in other words, one part of the first radiator 11 is disposed on the first side edge 515, and the other part is disposed on the bottom edge 514. The metal frame 51 between the first coupling gap 41 and the second coupling gap 42 forms the second radiator 21. The second side edge 516 is grounded at a position near the second coupling gap 42, so as to form a second ground end G. The metal frame 51 between the second ground end G and the second coupling gap 42 forms the third radiator 23.

Figure 25:
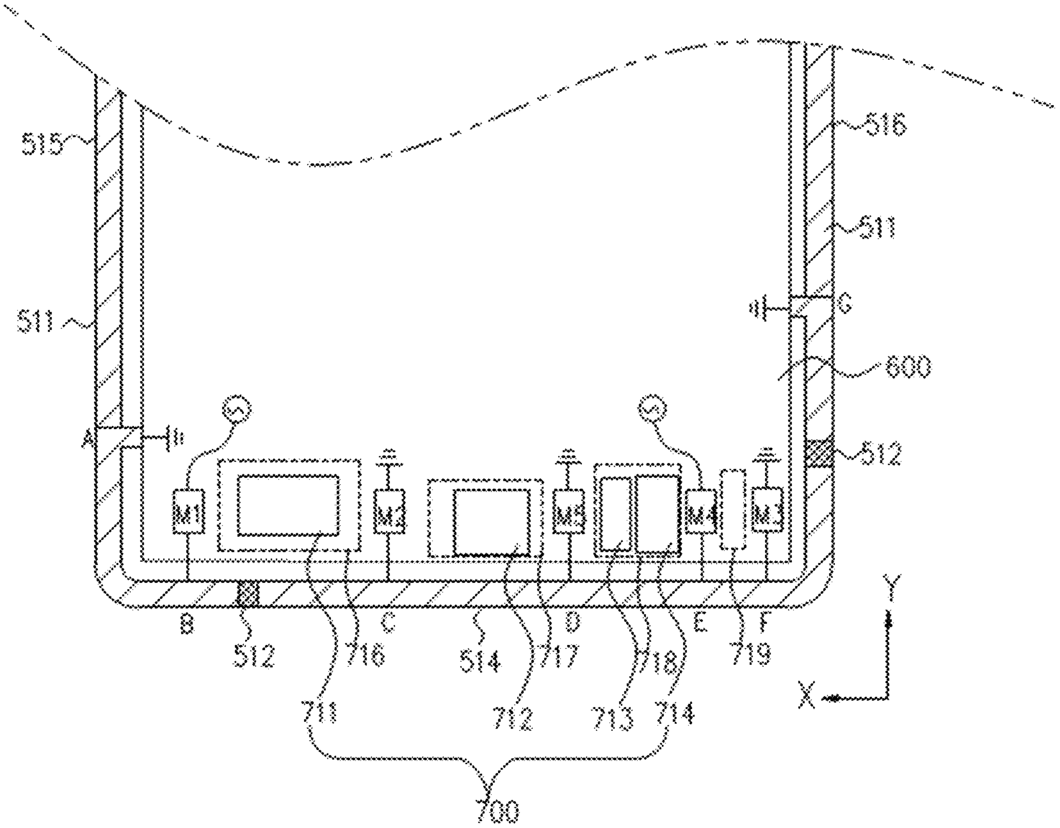
FIG. 25 is another schematic structural diagram of the third type of antenna assembly arranged in an electronic device according to an implementation of the disclosure.

Please refer to FIG. 25, the electronic device 1000 further includes a circuit board 600 and an electronic assembly 700 that are disposed inside the frame 51 and close to the bottom edge 514. The circuit board 600 includes, but is not limited to, a rigid circuit board 600, a flexible circuit board 600, a flexible and rigid board, and the like. The circuit board 600 is arranged close to the bottom edge 514, the bottom of the first side edge 515 (close to the bottom edge 514), and the bottom of the second side edge 516 (close to the bottom edge 514). The reference ground GND, the first to fifth matching circuits M1-M5, the first signal source 12, and the second signal source 22 may all be disposed on the circuit board 600.

Please refer to FIG. 25, the electronic assembly 700 includes at least one of a speaker 711, a USB interface device 712, an earphone base 713, and a SIM card slot assembly 714. The second antenna 20 further includes a feeding branch and multiple ground branches that are disposed on the circuit board 600 and electrically connected to the second radiator 21. The feeding branch includes the fourth matching circuit M4 and the second signal source 22. The ground branch includes a grounded second matching circuit M2, a grounded fifth matching circuit M5, a grounded third matching circuit M3, and the like.

Please refer to FIG. 25, the electronic assembly 700 is located between the feeding branch and the ground branch or between two adjacent ground branches. For example, a first space 716 is defined between a branch connecting the first matching circuit M1 and the first signal source 12 and the grounded second matching circuit M2, a second space 717 is defined between the grounded second matching circuit M2 and the grounded fifth matching circuit M5, a third space 718 is defined between a branch connecting the second signal source 22 and the fourth matching circuit M4 and the grounded fifth matching circuit M5, a fourth space 719 is defined between a branch connecting the second signal source 22 and the fourth matching circuit M4 and the grounded third matching circuit M3. The multiple electronic assemblies 700 may be randomly disposed in the first to fourth spaces 716-719. In other words, the feeding branch and the ground branch on the antenna assembly 100 may be disposed to avoid the electronic assembly 700, so that the electronic assembly 700 and the antenna assembly 100 are disposed in a staggered manner, thereby further reducing an arrangement space of the electronic assembly 700 and the antenna assembly 100, reducing interference of a device layout, improving structural compactness, and reducing a whole machine size.

In one implementation, referring to FIG. 25, the speaker 711 is located in the first space 716, corresponding to the first coupling gap 41. The first coupling gap 41 may be multiplexed with a hole(s) of the speaker 711 (for spreading out a sound coming from the speaker 711). For example, at least one hole of the speaker 711 is opened on the insulation segment 512 filled in the first coupling gap 41, so as to reduce holes of the speaker 711 opened on the second radiator 21.

In an implementation, referring to FIG. 25, the second space 717 is in the middle of the bottom edge 514, and the USB interface device 712 is disposed in the second space 717. A USB hole is opened on the second radiator 21, the metal bottom edge 514 is insulated from the USB interface device 712 by means of an isolation member, and a conductive joint of a charging cable is insulated from the metal bottom edge 514 by means of the isolation member, thereby improving performance compatibility of the USB interface device 712 and the antenna assembly 100. Further, the isolation member may also be used as a sealing member for sealing the USB hole, so as to improve the waterproof and sealing performance of the USB hole.

In an implementation, referring to FIG. 25, the earphone base 713 and/or the SIM card slot assembly 714 are disposed in the third space 718. When the earphone base 713 is arranged in the third gap 718, the second radiator 21 is provided with an earphone hole corresponding to the earphone base 713, and a conductive joint of the earphone is insulated from the metal bottom edge 514 by means of an isolation member, so as to improve performance compatibility between the earphone base 713 and the antenna assembly 100. Further, the isolation member may also be used as a sealing member for sealing the earphone hole, so as to improve the waterproof and sealing performance of the earphone hole. When the SIM card slot assembly 714 is disposed in the third space 718, the second radiator 21 defines a SIM hole corresponding to the SIM card slot assembly 714, and a conductive joint of the SIM card slot assembly 714 is insulated from the metal bottom edge 514 by means of an isolation member, so that the performance compatibility of the SIM card slot assembly 714 and the antenna assembly 100 is improved. Further, the isolation member may also be used as a sealing element for sealing the SIM hole, so as to improve the waterproof and sealing performance of the SIM hole.

The antenna assembly 100 provided in the implementations of the disclosure can also effectively and accurately detect the proximity of a human body. The detection function can be applied to reduce the T/R power of the antenna assembly 100 when the human body is in proximity, thereby reducing the specific absorption rate (SAR) of the human body to the electromagnetic wave, reducing the radiation influence of the electronic device 1000 on the human body, and further improving the application reliability of the electronic device 1000.

The second antenna 20 includes a first radio frequency front-end unit which is electrically connected to the second radiator 21, where the first radio frequency front-end unit includes a grounded second matching circuit M2, a grounded fifth matching circuit M5, a second signal source 22, a fourth matching circuit M4, and a grounded third matching circuit M3.

Figure 26:
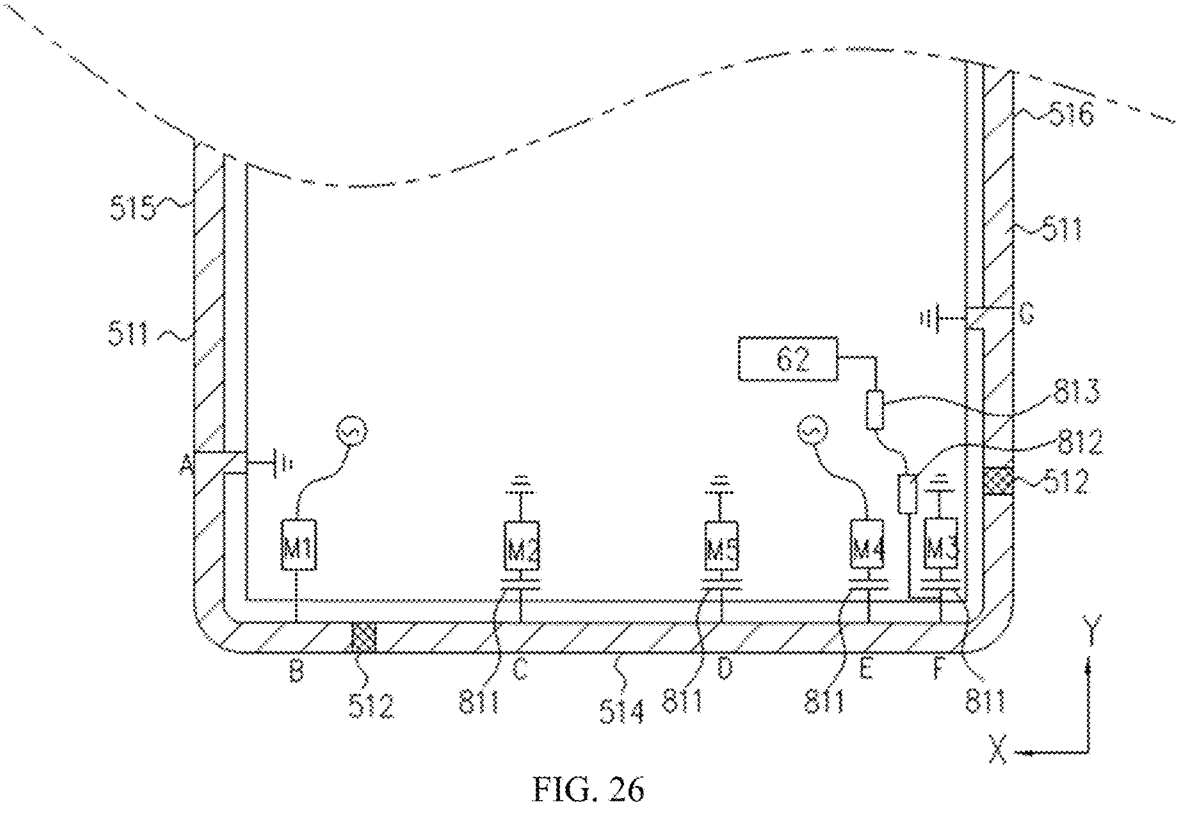
FIG. 26 is a schematic structural diagram of a fifth type of antenna assembly according to an implementation of the disclosure.

Please refer to FIG. 26, the antenna assembly 100 further includes a first isolator 811, a second isolator 812, a first proximity sensor 813, and a second controller 62.

Please refer to FIG. 26, the first isolator 811 is disposed between the first radio frequency front-end unit and the second radiator 21. The first isolator 811 is configured to isolate a first induction signal generated when a subject to-be-detected (for example, the head of the human body) is close to the second radiator 21 and conduct an electromagnetic wave signal transmitted/received by the second radiator 21. Specifically, there are multiple first isolators 811. The multiple first isolators 811 are respectively disposed between the second radiator 21 and the second matching circuit M2, between the second radiator 21 and the fifth matching circuit M5, between the second radiator 21 and the fourth matching circuit M4, and between the second radiator 21 and the third matching circuit M3. The first isolator 811 is configured to isolate the first induction signal generated when the subject to-be-detected is close to the second radiator 21 and conduct the electromagnetic wave signal transmitted/received by the second radiator 21. Specifically, the first isolator 811 at least includes a blocking capacitor, and the subject to-be-detected includes, but is not limited to, the head of the human body. The multiple first isolators 811 are disposed so that the second radiator 21 is in a "flying" state relative to a direct current signal, so as to sense the electrical signal change caused by proximity of the head of the human body.

It can be understood that, when the component connecting the second matching circuit M2 and the second radiator 21 is a capacitor, the capacitor may be reused as the first isolator 811, and no blocking capacitor needs to be additionally provided. Accordingly, this also applies to the third matching circuit M3, the fourth matching circuit M4 and the fifth matching circuit M5, which will not be repeated here.

Please refer to FIG. 26, one end of the second isolator 812 is electrically connected between the second radiator 21 and the first isolator 811. The second isolator 812 is configured to isolate an electromagnetic wave signal transmitted/received by the second radiator 21 and conduct the first induction signal. Specifically, the second isolator 812 at least includes an isolation inductor to isolate an electrical signal with a relatively high frequency, for example, an alternating current signal.

It can be understood that, the first induction signal generated by the second radiator 21 is a direct current signal, and the electromagnetic wave signal transmitted/received by the second radiator 21 is an alternating current signal. By providing the first isolator 811 between the second radiator 21 and the first radio frequency front-end unit, the first induction signal does not flow to the first radio frequency front-end unit via the second radiator 21 and will not affect signal T/R of the second antenna 20. By providing the second isolator 812 between the first proximity sensor 813 and the second radiator 21, the electromagnetic wave signal does not flow to the first proximity sensor 813 via the second radiator 21, thereby improving the sensing efficiency of the first proximity sensor 813 on the proximity induction signal.

Please refer to FIG. 26, the first proximity sensor 813 is electrically connected to the other end of the second isolator 812 and is configured to sense the magnitude of the first induction signal. The disclosure does not limit the specific structure of the first proximity sensor 813. The first proximity sensor 813 includes, but is not limited to, a sensor configured to sense a capacitance change or an inductance change, and is configured to detect a capacitance change of the first isolator 811 connected to the first proximity sensor 813 or an inductance change of the second isolator 812 connected to the first proximity sensor 813.

The second controller is electrically connected to one end of the first proximity sensor 813 that is far away from the second isolator 812, and is configured to determine, according to the magnitude of the first induction signal, whether a subject to-be-detected is close to the second radiator 21, and reduce the power of the second antenna 20 when the subject to-be-detected is close to the second radiator 21. Specifically, when the second controller detects that the first induction signal is greater than or equal to the preset threshold, the second controller determines that the subject to-be-detected is close to the second radiator 21, and controls to reduce the power of the second antenna 20. When the power of the antenna is reduced, the radiation performance of the antenna is also correspondingly reduced, and the specific absorption rate of the human body to the electromagnetic wave radiated by the antenna is also correspondingly reduced, thereby further improving the reliability of the electronic device 1000.

One specific scenario is as follows. The body surface of the human body is charged, and when the human body is close to the second radiator 21, an electric field is formed between the second radiator 21 and the body surface. The first isolator 811 senses a capacitance change caused by superposition of the electric field between the body surface and the second radiator 21, as a result, the electrical signal flowing through the second isolator 812 changes, so that the first proximity sensor 813 can sense the first induction signal greater than the preset threshold. When the first proximity sensor 813 detects that the human body is close to the second antenna 20, the transmission power of the second antenna 20 can be reduced, and thus the specific absorption rate of the human body to the electromagnetic wave signal transmitted by the second antenna 20 can be reduced. When the first proximity sensor 813 detects that the human body is far away from the second antenna 20, the transmission power of the second antenna 20 can be increased so as to improve the antenna performance of the antenna assembly 100 without increasing the specific absorption rate of the human body to the electromagnetic wave signal transmitted by the second antenna 20, thus realizing the intelligent adjustment of the radiation performance of the electronic device 1000. Since the radiator of the antenna assembly 100 can not only serve as a carrier for electromagnetic wave T/R, but also serve as a carrier for sensing the proximity of an electric field of the human body, a dual function is achieved, and the function of the antenna assembly 100 is added without increasing the size of the radiator, thereby facilitating the implementation of the electronic device 1000 with multiple functions, a high integration level and a small size.

In addition to electromagnetic wave signal T/R, the radiator of the antenna assembly 100 can also be used as a sensing electrode detecting the proximity of the subject to-be-detected such as the human body, and can isolate the induction signal and the electromagnetic wave signal through the first isolator 811 and the second isolator 812 respectively. As such, in this disclosure, it is possible to achieve the communication performance and the function of sensing the subject to-be-detected of the antenna assembly 100, achieve intelligent adjustment of the radiation performance of the electronic device 1000 and improve the security performance of the electronic device 1000, and improve the utilization rate of the components of the electronic device 1000, thereby reducing the overall size of the electronic device 1000.

Further, in terms of reducing the specific absorption rate of the human body to the electromagnetic wave radiated by the electronic device 1000, the specific absorption rate of the human body to the electromagnetic wave radiated by the electronic device 1000 can be reduced in a more necessary scenario in combination with other detectors or functions in the electronic device 1000. For example, when the head of the human body is close to the electronic device 1000, the power of the electronic device 1000 is reduced, and then the specific absorption rate of the head of the human body to the electromagnetic wave radiated by the electronic device 1000 is reduced. In a scenario where the head of the human body is close to the electronic device 1000, whether the electronic device 1000 is in a call state can be detected. Specifically, when it is detected that the electronic device 1000 is in the call state and the human body is close to the radiator of the electronic device 1000, it is highly likely that the head of the human body is close to the electronic device 1000 to prepare for answering a call. In this case, the power of the antenna assembly 100 can be reduced to reduce the radiation of the electromagnetic wave radiated by the electronic device 1000 to the head of the human body, and the specific absorption rate of the head of the human body to the electromagnetic wave radiated by the electronic device 1000 can be reduced. For the detection that the electronic device 1000 is in the call state, it may be achieved by detecting whether a receiver and an earpiece are in a working state.

Further, multiple antenna assemblies 100 may be disposed on several sides of the electronic device 1000 respectively, and the radiators of the antenna assemblies 100 are all used as carriers for detecting proximity of the electric field of the human body to the electronic device 1000. When the electric field of the human body is detected on sides of the electronic device 1000 and the display screen 300 is in a screen-off state, it indicates that the electronic device 1000 may be in a portable state. In this case, the electronic device 1000 may control to reduce the power of all antenna assemblies 100, so as to reduce the specific absorption rate of the human body to the electromagnetic wave radiated by the antenna assemblies 100, and further save electric quantity.

Please refer to FIG. 26, the second radiator 21 at least covers or is disposed at one corner of the frame 51 (the corner refers to an intersection of two adjacent sides). For example, the second radiator 21 covers the bottom edge 514, the second side edge 516, and a corner between the bottom edge 514 and the second side edge 516. In this way, the second radiator 21 can detect proximity of the human body facing the front surface, the rear surface, the bottom surface, and the second side edge 516.

The above is an implementation in which the second radiator 21 is used as a carrier for sensing an electric field of the human body. Since the second antenna 20 is an antenna for T/R of a low-frequency signal, the length of the second radiator 21 is relatively long, and by setting the second radiator 21 as a carrier for sensing the proximity of the electric field of the human body, the proximity of the human body can be detected within a relatively large range on the electronic device 1000, thereby improving the accuracy of the proximity detection of the human body. Certainly, the first radiator 11 and the third radiator 23 can also be separately used as carriers for sensing the electric field of the human body, or used together with the second radiator 21 as carriers for sensing the electric field of the human body. For details, refer to the following implementations.

Figure 27:
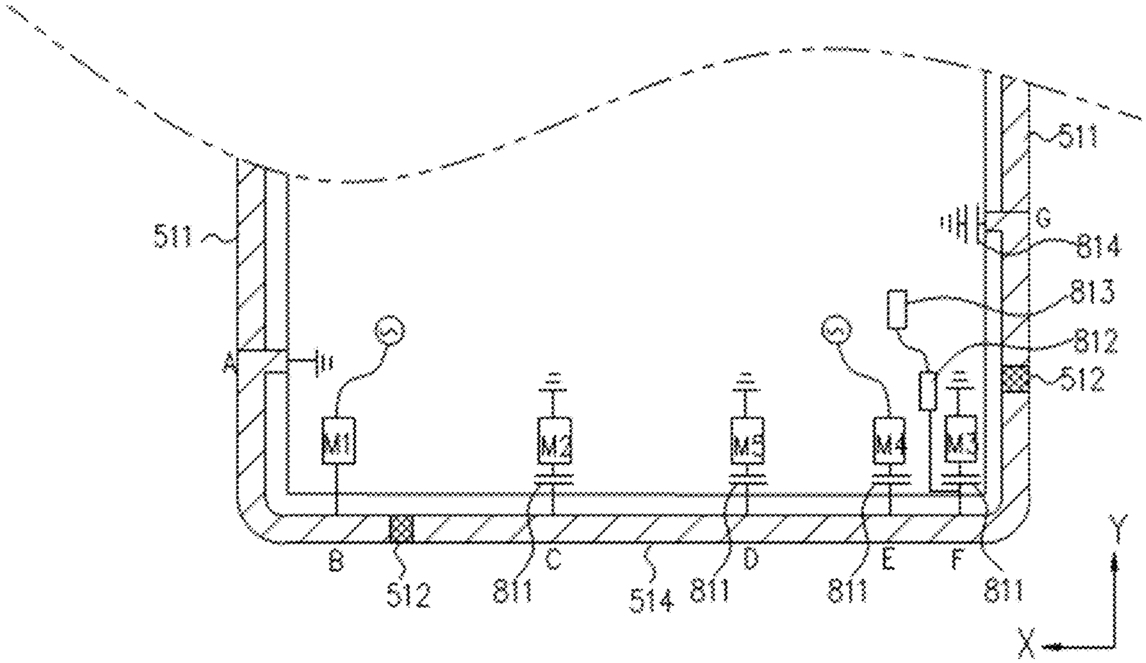
FIG. 27 is a schematic structural diagram of a sixth type of antenna assembly according to an implementation of the disclosure.

Please refer to FIG. 27, the second antenna 20 further includes a third isolator 814. One end of the third isolator 814 is electrically connected to the second ground end G, and the other end is grounded. The third isolator 814 is a blocking capacitor, so that the third radiator 23 is in a “flying” state with respect to the direct current signal. The principle for the third radiator 23 to detect the proximity of the electric field of the human body is the same as the principle for the second radiator 21 to detect the proximity of the electric field of the human body, and details are not described herein again.

In a first possible implementation, when an electric field of the human body is close to the third radiator 23, the third radiator 23 generates a second induction signal, and transmits the second induction signal to the second radiator 21 through the second coupling gap 42, so that the second radiator 21 generates a sub-induction signal. The first proximity sensor 813 detects the sub-induction signal and reduces the power of the second antenna 20.

In this implementation, both the second radiator 21 and the third radiator 23 serve as sensing electrodes for sensing proximity of the subject to-be-detected, and a proximity sensing path of the third radiator 23 is from the third radiator 23 to the second radiator 21 and then to the first proximity sensor 813. In other words, when the subject to-be-detected is close to the third radiator 23, the third radiator 23 generates the second induction signal, and the second induction signal makes, through the first coupling gap 41, the second radiator 21 generate the sub-induction signal, so that the first proximity sensor 813 can also sense the subject to-be-detected at the third radiator 23. There is no need to use two proximity sensors, and the coupling effect between the second radiator 21 and the third radiator 23 and the first proximity sensor 813 are also fully utilized, so that the second radiator 21 and the third radiator 23 can also be used in proximity detection, thereby increasing the utilization rate of the devices, reducing the number of devices, and further facilitating the integration and miniaturization of the electronic device 1000.

Figure 28:
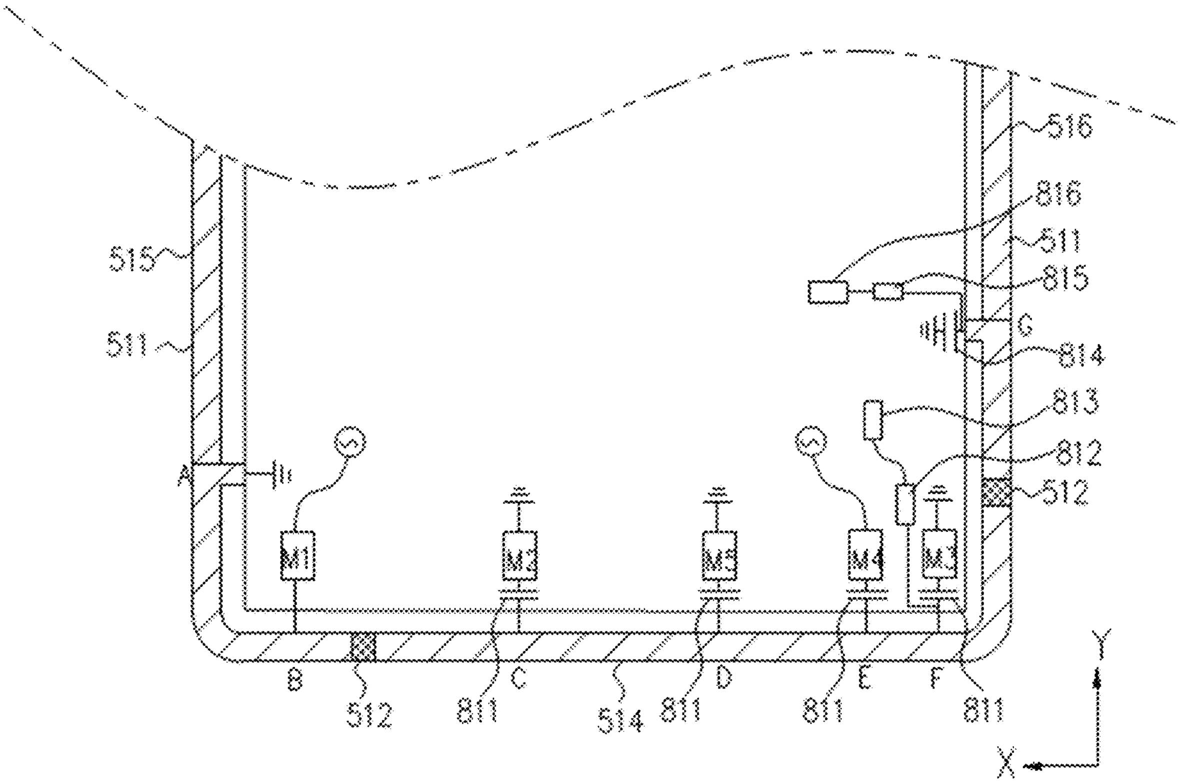
FIG. 28 is a schematic structural diagram of a seventh type of antenna assembly according to an implementation of the disclosure.

In a second possible implementation, referring to FIG. 28, the third radiator 23 is disposed on the second side edge 516. An insulation segment 512 is disposed between the second ground end G and the metal second side edge 516 of the non-third radiator 23, so that the third radiator 23 is disconnected from other metal second side edges 516. The second antenna 20 further includes a fourth isolator 815, where one end of the fourth isolator 815 is electrically connected between the third radiator 23 and the third isolator 814 or electrically connected to the third radiator 23, and is configured to isolate electromagnetic wave signals transmitted/received by the third radiator 23 and conduct second induction signals. Specifically, the fourth isolator 815 includes an isolation inductor.

Further, referring to FIG. 28, the antenna assembly 100 further includes a second proximity sensor 816. The second proximity sensor 816 is electrically connected to the other end of the fourth isolator 815 and is configured to sense the magnitude of the second induction signal. Specifically, the second radiator 21 and the third radiator 23 are both sensing electrodes that sense the proximity of the subject to-be-detected, and the proximity sensing path of the second radiator 21 is independent from the proximity sensing path of the third radiator 23, so that it can be accurately detected that the subject to-be-detected is close to the second radiator 21 or the third radiator 23, thereby timely responding to the foregoing proximity behavior. Specifically, when the subject to-be-detected is close to the third radiator 23, the second induction signal generated by the third radiator 23 is a direct current signal. The electromagnetic wave signal is an alternating current signal. The fourth isolator 815 is disposed between the third radiator 23 and the reference ground GND, so that the second induction signal does not flow to the reference ground GND through the third radiator 23 and will not affect signal T/R of the second antenna 20. By providing the fourth isolator 815 between the second proximity sensor 816 and the third radiator 23, the electromagnetic wave signal does not flow to the second proximity sensor 816 through the third radiator 23, thus improving the sensing efficiency of the second proximity sensor 816 for the second induction signal. The specific structure of the second proximity sensor 816 is not limited in the disclosure. The second proximity sensor 816 includes, but is not limited to, a sensor configured to sense a capacitance change or an inductance change.

In other implementations, only the second proximity sensor 816 is provided, and the first proximity sensor 813 is not provided, and the inductive signal of the second radiator 21 is transferred to the second proximity sensor 816 through the third radiator 23 with aid of the coupling between the second radiator 21 and the third radiator 23.

Figure 29:
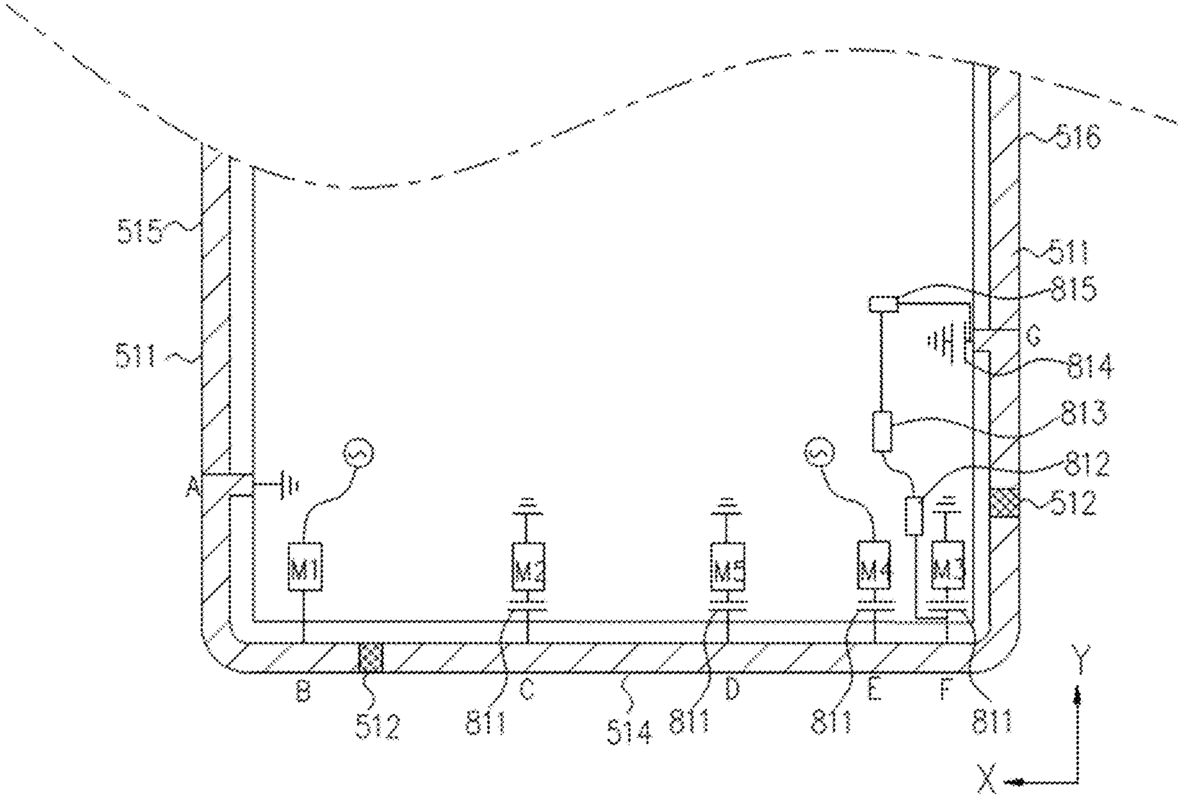
FIG. 29 is a schematic structural diagram of an eighth type of antenna assembly according to an implementation of the disclosure.

In a third possible implementation, referring to FIG. 29, this implementation is different from the second implementation in that the second proximity sensor 816 is not provided. The other end of the fourth isolator 815 is electrically connected to the first proximity sensor 813. When the second radiator 21 and the third radiator 23 are in capacitive coupling, a coupling induction signal is generated. The first proximity sensor 813 is further configured to sense a change of the coupling induction signal when the subject to-be-detected is close to the second radiator 21 and/or the third radiator 23.

Specifically, when the second radiator 21 is coupled with the third radiator 23, a constant electric field is generated, which is featured by generating a stable coupling induction signal. When the human body is close to the constant electric field, the constant electric field changes, which is manifested as a change in the coupling induction signal, and the proximity of the human body is detected according to the change of the coupling induction signal.

In this implementation, both the second radiator 21 and the third radiator 23 serve as sensing electrodes, and may perform accurate detection when the human body is close to an area corresponding to the second radiator 21, an area corresponding to the third radiator 23, and an area corresponding to the second coupling gap 42. There is no need to use two proximity sensors, and the coupling effect between the second radiator 21 and the third radiator 23 and the first proximity sensor 813 are also fully utilized, so that the second radiator 21 and the third radiator 23 can also be used in proximity detection, thereby increasing the utilization rate of the devices, reducing the number of devices, and further facilitating the integration and miniaturization of the electronic device 1000.

Figure 30:
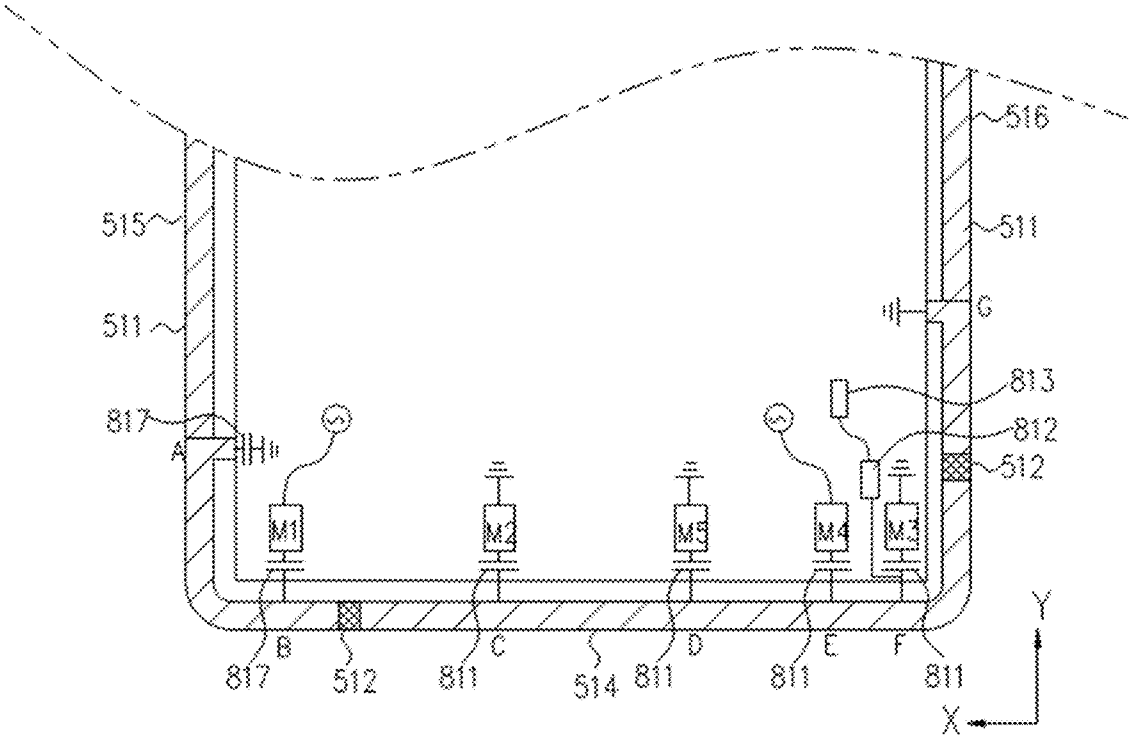
FIG. 30 is a schematic structural diagram of a ninth type of antenna assembly according to an implementation of the disclosure.

Please refer to FIG. 30, the first antenna 10 further includes a fifth isolator 817. There are multiple fifth isolators 817. The fifth isolators 817 are electrically connected between the first ground end A of the first radiator 11 and the reference ground GND, and between the first feeding point B and the first matching circuit M1. Alternatively, the first ground end A may be insulated from a metal frame other than the first radiator 11, and the fifth isolator 817 is a blocking capacitor, so that the first radiator 11 is in a "flying" state relative to the direct current signal. The principle for the first radiator 11 to detect the proximity of the electric field of the human body is the same as the principle for the second radiator 21 to detect the proximity of the electric field of the human body, and details are not described herein again.

In a possible implementation, when the electric field of the human body is close to the first radiator 11, the first radiator 11 generates a third induction signal, and transfers the third induction signal to the second radiator 21 through the first coupling gap 41, so that the second radiator 21 generates a sub-induction signal. The first proximity sensor 813 detects the sub-induction signal and reduces the power of the first antenna 10. In this implementation, the sensing path is the first radiator 11, the second radiator 21, and the first proximity sensor 813.

Figure 31:
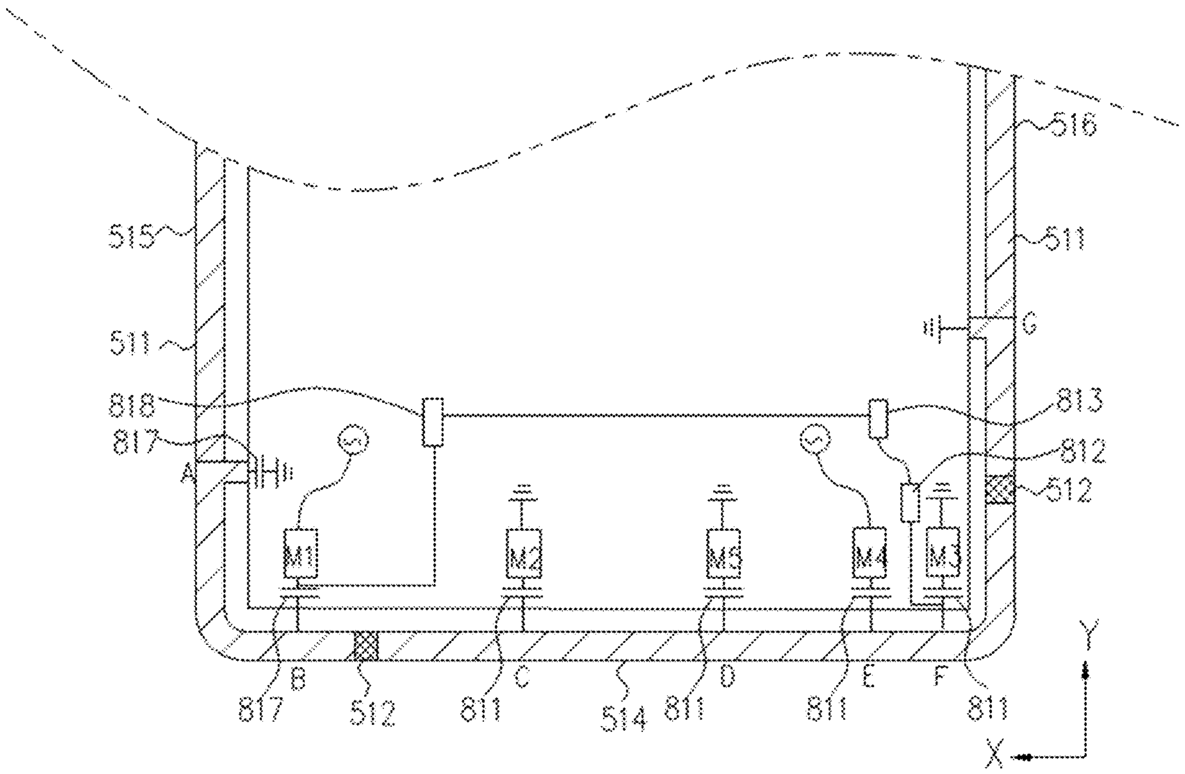
FIG. 31 is a schematic structural diagram of a tenth type of antenna assembly according to an implementation of the disclosure.

In a second possible implementation, referring to FIG. 31, the first radiator 11 is disposed on the first side edge 515. An insulation segment 512 is disposed between the first ground end A and the first metal side edge 515 other than the first side edge 515 of the first radiator 11, so as to disconnect the first radiator 11 from other first metal side edges 515. The first antenna 10 further includes a sixth isolator 818, where one end of the sixth isolator 818 is electrically connected between the first radiator 11 and the fifth isolator 817 or electrically connected to the first radiator 11, and is configured to isolate an electromagnetic wave signal transmitted/received by the first radiator 11 and conduct the third induction signal. In particular, the sixth isolator 818 includes an isolation inductor.

The other end of the sixth isolator 818 is electrically connected to the first proximity sensor 813. When the second radiator 21 is in capacitive coupling to the first radiator 11, a coupling induction signal is generated. The first proximity sensor 813 is further configured to sense the change of the coupling induction signal when the subject to-be-detected is close to the second radiator 21 and/or the first radiator 11.

Specifically, when the second radiator 21 is coupled with the first radiator 11, a constant electric field is generated, which is featured by generating a stable coupling induction signal. When the human body is close to the constant electric field, the constant electric field changes, which is manifested as a change in the coupling induction signal, and the proximity of the human body is detected according to the change of the coupling induction signal.

Figure 32:
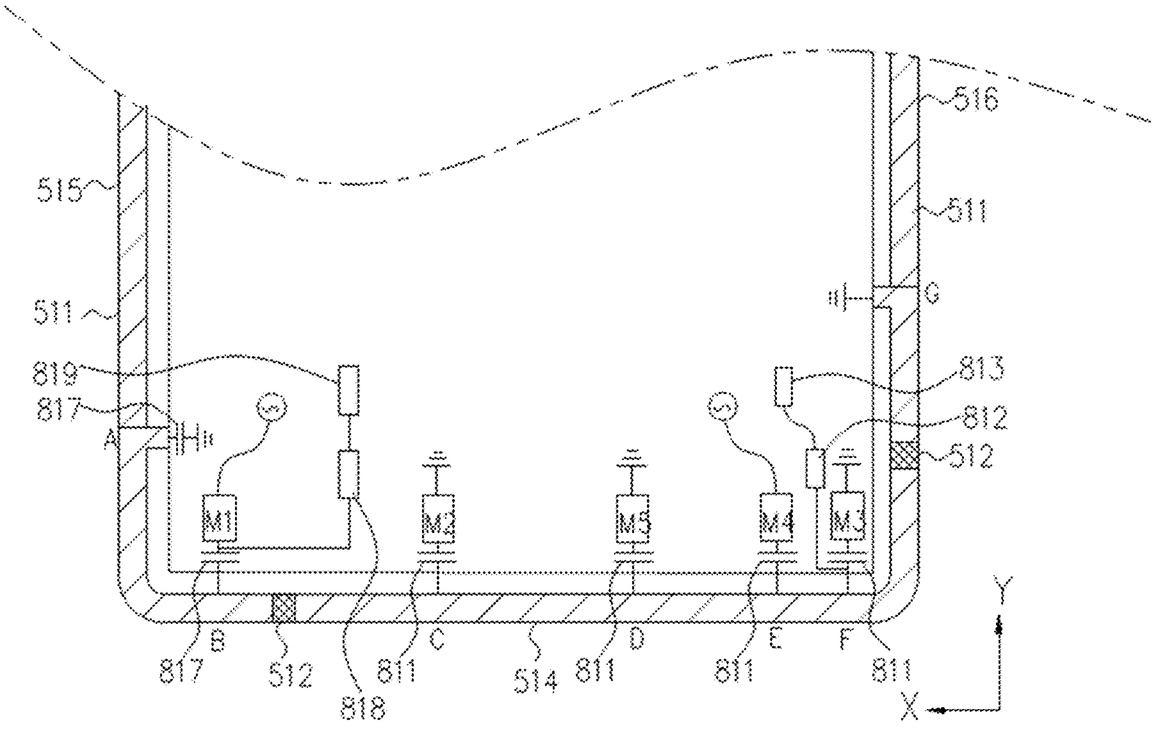
FIG. 32 is a schematic structural diagram of an eleventh type of antenna assembly according to an implementation of the disclosure.

In a third possible implementation, referring to FIG. 32, this implementation differs from the foregoing second implementation in that the sixth isolator 818 is not electrically connected to the first proximity sensor 813. The antenna assembly 100 further includes a third proximity sensor 819 electrically connected to the other end of the sixth isolator 818 for sensing the magnitude of the third induction signal. Specifically, the second radiator 21 and the first radiator 11 are both sensing electrodes that sense the proximity of the subject to-be-detected, and the proximity sensing path of the second radiator 21 is independent from the proximity sensing path of the first radiator 11, so that it can be accurately detected that the subject to-be-detected is close to the second radiator 21 or the first radiator 11, thereby timely responding to the described proximity behavior. Specifically, when the subject to-be-detected is close to the first radiator 11, the third induction signal generated by the first radiator 11 is a direct current signal. The electromagnetic wave signal is an alternating current signal. By providing the sixth isolator 818 between the first radiator 11 and the reference ground GND, the third induction signal does not flow to the reference ground GND through the first radiator 11 and will not affect signal T/R of the second antenna 20. By providing the sixth isolator 818 between the second proximity sensor 816 and the first radiator 11, the electromagnetic wave signal does not flow to the third proximity sensor 819 through the first radiator 11, thereby improving the sensing efficiency of the third proximity sensor 819 for the third induction signal. The disclosure does not limit the specific structure of the third proximity sensor 819. The third proximity sensor 819 includes, but is not limited to, a sensor for sensing a capacitance change or an inductance change. In this implementation, the sensing path of the first radiator 11 may be independent from the sensing path of the second radiator 21.

The first radiator 11, the second radiator 21 and the third radiator 23 each form a detecting electrode, so that the area of the detecting electrode can be increased, and the proximity of the subject to-be-detected can be detected in a larger range, thereby improving the accuracy of adjusting radiation performance of the electronic device 1000.

In the antenna assembly and the electronic device provided herein, by designing the radiator of the first antenna and the radiator of the second antenna to be in capacitive coupling via the first coupling gap, the signal source of the first antenna can excite, by means of coupling of the first radiator, the radiator of the second antenna to transmit and receive an electromagnetic wave signal of a corresponding band. In this way, the radiator of the second antenna can also be used as the radiator of the first antenna, the space for stacking the radiator of the first antenna and the radiator of the second antenna is saved, and the overall size of the antenna assembly is reduced, which is beneficial to the overall miniaturization of the electronic device. By having the second coupling gap in the radiator of the second antenna, the second radiator can generate at least one resonant mode at a position close to the second coupling gap under excitation of the signal source of the first antenna, so as to increase the number of positions where the resonant mode is generated, thereby increasing the number of resonant modes generated, and further increasing the bandwidth of a signal transmitted or received by the antenna assembly.

The above are only some implementations of the disclosure. It should be noted that, a person skilled in the art may make further improvements and modifications without departing from the principle of the disclosure, and these improvements and modifications shall also belong to the scope of protection of the disclosure.

What is claimed is:

1. An antenna assembly comprising:

a first antenna comprising a first radiator and a first signal source electrically connected to the first radiator; and a second antenna comprising a second radiator and a third radiator, wherein one end of the second radiator is spaced apart from one end of the first radiator with a first coupling gap, and another end of the second radiator is spaced apart from one end of the third radiator with a second coupling gap;

wherein the first radiator is configured to generate at least one resonant mode under excitation of the first signal source, and a part of the second radiator that is close to the second coupling gap is configured to generate at least one resonant mode under excitation of the first signal source through coupling of the first radiator;

wherein the first signal source is configured to excite through the first coupling gap, a part of the second radiator that is close to the first coupling gap and the part of the second radiator that is close to the second coupling gap to generate at least one resonant mode, wherein the at least one resonant mode comprises a first sub-resonant mode and a second sub-resonant mode, wherein a resonant frequency of the first sub-resonant mode is less than a resonant frequency of the second sub-resonant mode.

2. The antenna assembly of claim 1, wherein a resonant frequency of the at least one resonant mode generated by the first radiator under the excitation by the first signal source is different than a resonant frequency of the at least one resonant mode generated by the second radiator under the excitation through coupling of the first radiator.

3. The antenna assembly of claim 2, wherein a bandwidth of a band formed by a combination of a band covered by the resonant mode generated by the first radiator under excitation of the first signal source and a band covered by the resonant mode generated by the second radiator under excitation of the first signal source is 500 MHz~1000 MHz, and/or the band covered by the resonant mode generated by the first radiator under excitation of the first signal source and the band covered by the resonant mode generated by the second radiator under excitation of the first signal source are both greater than 1000 MHz.

4. The antenna assembly of claim 2, wherein a band formed by a combination of a band covered by the resonant mode generated by the first radiator under excitation of the first signal source and a band covered by the resonant mode generated by the second radiator under excitation of the first signal source covers 1000 MHz-6000 MHz.

5. The antenna assembly of claim 1, wherein:

one of the first sub-resonant mode and the second sub-resonant mode is generated by the part of the second radiator close to the first coupling gap, and the other one of the first sub-resonant mode and the second sub-resonant mode is generated by the part of the second radiator close to the second coupling gap; or the first sub-resonant mode and the second sub-resonant mode are both generated by the part of the second radiator close to the second coupling gap.

6. The antenna assembly of claim 1, wherein the at least one resonant mode generated by the first radiator under excitation of the first signal source comprises a third sub-resonant mode and a fourth sub-resonant mode, wherein a resonant frequency of the third sub-resonant mode is less than a resonant frequency of the fourth sub-resonant mode.

7. The antenna assembly of claim 6, wherein:

the resonant frequency of the second sub-resonant mode is less than the resonant frequency of the third sub-resonant mode; or the resonant frequency of the second sub-resonant mode is greater than the resonant frequency of the third sub-resonant mode and less than the resonant frequency of the fourth sub-resonant mode, and the resonant frequency of the first sub-resonant mode is less than or greater than the resonant frequency of the third sub-resonant mode; or the resonant frequency of the second sub-resonant mode is greater than the resonant frequency of the fourth sub-resonant mode, and the resonant frequency of the first sub-resonant mode is less than the resonant frequency of the third sub-resonant mode, or the resonant frequency of the first sub-resonant mode is greater than the resonant frequency of the third sub-resonant mode and less than the resonant frequency of the fourth sub-resonant mode, or the resonant frequency of the first sub-resonant mode is greater than the resonant frequency of the fourth sub-resonant mode.

8. The antenna assembly of claim 6, wherein the resonant mode generated by the first radiator under excitation of the first signal source further comprises a fifth sub-resonant mode, a resonant frequency of the fifth sub-resonant mode, the resonant frequency of the first sub-resonant mode, the resonant frequency of the second sub-resonant mode, the resonant frequency of the third sub-resonant mode, and the resonant frequency of the fourth sub-resonant mode increase sequentially; the fifth sub-resonant mode is a resonant mode where the first radiator operates in high-order resonance, and the third sub-resonant mode is a resonant mode where the first radiator operates in a ground state.

9. The antenna assembly of claim 8, wherein the first radiator comprises a first ground end, a first coupling end, and a first feeding point disposed between the first ground end and the first coupling end; the first ground end is grounded, and the first coupling end is an end where the first coupling gap is formed; the first antenna further comprises a first matching circuit; one end of the first matching circuit is electrically connected to the first signal source, and another end of the first matching circuit is electrically connected to the first feeding point;

wherein the first radiator between the first ground end and the first coupling end is configured to generate the third sub-resonant mode under action of the first signal source; part of first radiator between the first feeding point and the first coupling terminal is configured to generate the fourth sub-resonant mode under action of the first signal source; and the first radiator between the first ground end and the first coupling end is configured to generate the fifth sub-resonant mode under effect of capacitive coupling feed of the first signal source.

10. The antenna assembly of claim 8, wherein the second radiator comprises a second coupling end, a third coupling end, and a first resonant point and a second resonant point that are disposed between the second coupling end and the third coupling end, wherein the second coupling end is an end of the second radiator where the first coupling gap is formed, and the third coupling end is an end of the second radiator where the second coupling gap is formed; and wherein the second antenna further comprises a second matching circuit and a third matching circuit, wherein one end of the second matching circuit is grounded, another end of the second matching circuit is electrically connected to the first resonant point, one end of the third matching circuit is grounded, and another end of the third matching circuit is electrically connected to the second resonant point; wherein the second radiator between the first resonant point and the second coupling end is configured to generate the first sub-resonant mode under excitation through coupling of the first radiator, and the second radiator between the second resonant point and the third coupling end is configured to generate the second sub-resonant mode under excitation through coupling of the first radiator.

11. The antenna assembly of claim 1, wherein the second antenna further comprises a second signal source electrically connected to the second radiator, the second radiator is configured to generate at least one resonant mode under excitation of the second signal source, and a band covered by the resonant mode generated by the second radiator under excitation of the second signal source is less than 1000 MHz.

12. The antenna assembly of claim 11, wherein the second antenna further comprises a fourth matching circuit, a second matching circuit, and a third matching circuit; wherein the second radiator comprises a second coupling end, a third coupling end, and a first resonant point, a second feeding point, and a second resonant point that are disposed in sequence between the second coupling end and the third coupling end;

wherein the third radiator comprises a fourth coupling end and a second ground end, wherein the second ground end is grounded;

wherein the second coupling end is an end of the second radiator where the first coupling gap is formed, the second coupling gap is formed between the third coupling end and the fourth coupling end, one end of the fourth matching circuit is electrically connected to the second signal source, and another end of the fourth matching circuit is electrically connected to the second feeding point; one end of the second matching circuit is grounded, another end of the second matching circuit is electrically connected to the first resonant point, one end of the third matching circuit is grounded, another end of the third matching circuit is electrically connected to the second resonant point, and the second radiator between the first resonant point and the third coupling end is configured to generate at least one resonant mode under excitation of the second signal source; or the second radiator between the second resonant point and the second coupling end is configured to generate at least one resonant mode under excitation of the second signal source.

13. The antenna assembly of claim 12, wherein the second radiator further comprises a frequency tuning point, and the frequency tuning point is located between the first resonant point and the second feeding point; the second antenna further comprises a fifth matching circuit, one end of the fifth matching circuit is grounded, and another end of the fifth matching circuit is electrically connected to the frequency tuning point; wherein at least one of the second matching circuit, the third matching circuit, the fifth matching circuit, and the fourth matching circuit is configured to regulate a resonant frequency of the at least one resonant mode generated by the second radiator under excitation of the second signal source.

14. The antenna assembly according to claim 13, wherein the antenna assembly comprises a first controller, and the first controller is configured to determine, according to that the first coupling gap is in a free radiation scenario and the second coupling gap is in a blocked radiation scenario, that the second radiator is in a first radiation mode; further configured to determine, according to that the first coupling gap is in the blocked radiation scenario and the second coupling gap is in the free radiation scenario, that the second radiator is in a second radiation mode; and further configured to determine that the second radiator is in the first radiation mode or the second radiation mode when both the first coupling gap and the second coupling gap are in the free radiation scenario; wherein the first resonant mode is at least one resonant mode generated by the second radiator between the second resonant point and the second coupling end under excitation of the first signal source; the second resonant mode is at least one resonant mode generated by the second radiator between the first resonant point and the third coupling end under excitation of the second signal source.

15. The antenna assembly according to claim 14, wherein:

the second matching circuit comprises at least one first selection switch, a first high-impedance branch, and a first low-impedance branch, wherein the first selection switch is configured to select one of the first high-impedance branch and the first low-impedance branch to be electrically connected to the first resonant point;

the third matching circuit comprises at least one second selection switch, a second high-impedance branch, and a second low-impedance branch, and the second selection switch is configured to select one of the second high-impedance branch and the second low-impedance branch to be electrically connected to the second resonant point;

the first controller is electrically connected to the first selection switch and the second selection switch, and the first controller is configured to control the first selection switch to connect the first high-impedance branch to the first resonant point and control the second selection switch to connect the second low-impedance branch to the second resonant point according to that the first coupling gap is in the free radiation scenario and the second coupling gap is in the blocked radiation scenario; the first controller is configured to control the first selection switch to connect the first low-impedance branch to the first resonant point and control the second selection switch to connect the second high-impedance branch to the second resonant point according to that the first coupling gap is in the blocked radiation scenario and the second coupling gap is in the free radiation scenario.

16. The antenna assembly of claim 12, wherein the second antenna further comprises a middle-high frequency band-pass branch, one end of the middle-high frequency band-pass branch is grounded, and another end of the middle-high frequency band-pass branch is electrically connected to the fourth matching circuit.

17. The antenna assembly of claim 1, wherein the second antenna further comprises a radio frequency front-end unit electrically connected to the second radiator; and wherein the antenna assembly further comprises a first isolator, a second isolator, a proximity sensor, and a second controller, wherein the first isolator is disposed between the radio frequency front end unit and the second radiator, and the first isolator is configured to isolate an induction signal generated when a subject to-be-detected is close to the second radiator and conduct electromagnetic wave signals transmitted and received by the second radiator; one end of the second isolator is electrically connected between the second radiator and the first isolator or electrically connected to the second radiator, and the second isolator is configured to isolate the electromagnetic wave signals transmitted and received by the second radiator and conduct the induction signal; the proximity sensor is electrically connected to another end of the second isolator and is configured to sense a magnitude of the induction signal; and the second controller is configured to determine, according to the magnitude of the induction signal, whether the subject to-be-detected is close to the second radiator, and reduce power of the second antenna when the subject to-be-detected is close to the second radiator.

18. An electronic device, comprising:

a frame and an antenna assembly, wherein the antenna assembly comprises:

a first antenna comprising a first radiator and a first signal source electrically connected to the first radiator; and a second antenna comprising a second radiator and a third radiator, wherein one end of the second radiator is spaced apart from one end of the first radiator with a first coupling gap, and another end of the second radiator is spaced apart from one end of the third radiator with a second coupling gap;

wherein one or more of the following:

the first radiator is configured to generate at least one resonant mode under excitation of the first signal source, and a part of the second radiator that is close to the second coupling gap is configured to generate at least one resonant mode under excitation of the first signal source through coupling of the first radiator; wherein the first signal source is configured to excite through the first coupling gap, a part of the second radiator that is close to the first coupling gap and the part of the second radiator that is close to the second coupling gap to generate at least one resonant mode, wherein the at least one resonant mode comprises a first sub-resonant mode and a second sub-resonant mode, wherein a resonant frequency of the first sub-resonant mode is less than a resonant frequency of the second sub-resonant mode;

the first radiator, the second radiator, the third radiator and the frame are integrated into a whole; or the first radiator, the second radiator, and the third radiator are formed on a surface of the frame; or the first radiator, the second radiator, and the third radiator are disposed on a flexible circuit board, and the flexible circuit board is attached to a surface of the frame; and the frame comprises a plurality of side edges connected end to end in sequence, and two adjacent side edges are intersected; the first coupling gap and the second coupling gap are respectively disposed on two intersected side edges of the frame; or, the first coupling gap and the second coupling gap are both disposed on a same side edge of the frame.

19. The electronic device of claim 18, wherein the plurality of side edges comprises a top edge and a bottom edge opposite to the top edge, and a first side edge and a second side edge connected between the top edge and the bottom edge, wherein at least a part of the first radiator is disposed on the bottom edge, the first coupling gap is disposed on the bottom edge, and a part of the second radiator is disposed on the bottom edge, a remaining part of the second radiator is disposed on the second side edge, the third radiator is disposed on the second side edge, and the second coupling gap is disposed on the second side edge;

wherein the electronic device further comprises a circuit board and an electronic assembly which are disposed inside the frame and are close to the bottom edge, wherein the electronic assembly comprises at least one of a speaker, a universal serial bus (USB) interface device, an earphone base, and a subscriber identification module (SIM) card slot component; the second antenna further comprises a feeding branch and multiple ground branches that are disposed on the circuit board and electrically connected to the second radiator; and the electronic assembly is located between the feeding branch and the ground branch or between two adjacent ground branches.

20. The electronic device of claim 18, wherein:

one of the first sub-resonant mode and the second sub-resonant mode is generated by the part of the second radiator close to the first coupling gap, and the other one of the first sub-resonant mode and the second sub-resonant mode is generated by the part of the second radiator close to the second coupling gap; or the first sub-resonant mode and the second sub-resonant mode are both generated by the part of the second radiator close to the second coupling gap.

* * * * *